US009242536B2

(12) United States Patent
Rikkert

(10) Patent No.: US 9,242,536 B2
(45) Date of Patent: Jan. 26, 2016

(54) OPEN ROOF CONSTRUCTION FOR A VEHICLE

(71) Applicant: Inalfa Roof Systems Group B.V., Venray (NL)

(72) Inventor: Robert Rikkert, Nuenen (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 14/359,533

(22) PCT Filed: Nov. 20, 2012

(86) PCT No.: PCT/EP2012/073065
§ 371 (c)(1),
(2) Date: May 20, 2014

(87) PCT Pub. No.: WO2013/076058
PCT Pub. Date: May 30, 2013

(65) Prior Publication Data
US 2014/0327276 A1 Nov. 6, 2014

(30) Foreign Application Priority Data

Nov. 23, 2011 (EP) ..................................... 11190226

(51) Int. Cl.
*B60J 7/22* (2006.01)

(52) U.S. Cl.
CPC ......................................... *B60J 7/22* (2013.01)

(58) Field of Classification Search
CPC ....................................................... B60J 7/22
USPC ....................................................... 296/217
See application file for complete search history.

(56) References Cited

U.S. PATENT DOCUMENTS

| 2,839,985 | A | * | 6/1958 | Ross ............................. 454/150 |
| 4,395,939 | A | * | 8/1983 | Hough et al. ................. 454/129 |
| 5,836,643 | A | | 11/1998 | Preiss |
| 6,086,146 | A | * | 7/2000 | Nabuurs ........................ 296/217 |
| 6,217,110 | B1 | * | 4/2001 | Thijssen ........................ 296/217 |

(Continued)

FOREIGN PATENT DOCUMENTS

DE        4012569        5/1991
(Continued)

OTHER PUBLICATIONS

International Search Report and Written Opinion from corresponding foreign application PCT/EP2012/073065 filed Nov. 20, 2012.

*Primary Examiner* — Dennis H Pedder
(74) *Attorney, Agent, or Firm* — Steven M. Koehler; Westman, Champlin & Koehler, P.A.

(57) ABSTRACT

An open roof construction for a vehicle includes a first closing element movably supported by a stationary part and is configured to move to an upward position with at least its front edge. A second closing element movably supported by the stationary part and is positioned rearward of the first closing element. The second closing element moves between a closed position in which it closes said roof opening and an at least partly open position. An air guide on a lower side of the first closing element guides and directs the air caught by said first closing element when in its upward position during driving of the vehicle to create a boundary layer of air which is situated between the outside and the inside of the vehicle at the position of the roof opening when said second closing element is in its at least partly open position.

25 Claims, 25 Drawing Sheets

(56) References Cited

U.S. PATENT DOCUMENTS

| | | | |
|---|---|---|---|
| 6,817,659 B2 * | 11/2004 | Vogel et al. | 296/217 |
| 7,314,246 B2 | 1/2008 | MacNee, III et al. | |
| 7,357,441 B2 * | 4/2008 | Queveau et al. | 296/180.1 |

FOREIGN PATENT DOCUMENTS

| | | |
|---|---|---|
| DE | 10142167 | 11/2002 |
| DE | 10204309 | 11/2003 |
| DE | 10218387 | 11/2003 |
| EP | 0903253 | 3/1999 |
| FR | 2936981 | 4/2010 |
| JP | 61041621 | 2/1986 |
| JP | 63013819 | 1/1988 |
| JP | H0470516 | 6/1992 |
| JP | 2000264071 | 9/2000 |

* cited by examiner

OPEN ROOF CONSTRUCTION FOR A VEHICLE

CROSS-REFERENCE TO RELATED APPLICATION

This application is a Section 371 National Stage Application of International Application PCT/EP2012/073065 filed Nov. 20, 2012 and published as WO 2013/076058 A1 in English.

BACKGROUND

The discussion below is merely provided for general background information and is not intended to be used as an aid in determining the scope of the claimed subject matter.

Aspects of the present invention relate to an open roof construction for a vehicle having a roof opening in a fixed roof portion, comprising: a stationary part for attaching the open roof construction to the fixed roof portion, a first closing element movably supported by the stationary part and being capable of moving to an upward position with at least its front edge, particularly swiveling around a lateral axis with its frontal edge upwards to an upward position, and a second closing element, which is movably supported by the stationary part and being positioned rearward of the first closing element, said second closing element being capable of moving between a closed position in which it closes said roof opening and an at least partly open position.

Such roof assembly is known from EP 0 903 253 of applicant. The first closing element is a flap in the fixed roof portion which comprises a flow channel extending in upward direction in order to direct air over the roof opening.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

It is an object of the present invention to provide an open roof construction having an improved anti-booming effect.

According to a first aspect, it is proposed that said first closing element is provided with an air guide on its lower side, to guide and direct the air caught by said first closing element when in its upward position during driving of the vehicle into a boundary layer of air which is situated between the outside and the inside of the vehicle at the position of the roof opening when said second closing element is in its at least partly open position.

Due to the invention air is scooped from the area in front of the vehicle roof and is directed into the booming layer of air in the roof opening, which causes turbulence in this layer and thereby solves or at least reduces the problem of booming.

In accordance to another aspect, the first closing element is capable of opening and closing a part of the roof opening.

Thus in this embodiment, the closing element has a double function and hardly influences the appearance of the vehicle and open roof construction. No space is required in the fixed roof portion in front of the roof opening, although it is possible of course to create a distance between the front shield and the open roof construction. Even if there is no space between the front shield and the first closing element, there will generally be space available in the body below the first closing element for packaging this element and to create a drain.

In one embodiment, the air guide comprises at least one baffle for guiding and directing the air, said baffle projecting downwardly from the lower side of the first closing element. The baffle can be a separate element, or be incorporated, for example in and/or formed from the encapsulating material.

In another embodiment, the air guide comprises at least one solid body projecting downward from the lower side of the first closing element, said solid body having a shape suitable for guiding an airflow in a desired direction when said first closing element is in its upward position, said solid body may be formed as an integral part of the first closing element.

In still another embodiment, the air guide comprises at least one duct for guiding and directing the air, said duct projecting downward from the lower side of the first closing element. A part of the duct may be formed by the lower side of the first closing element or at least partly by a solid body attached to the first closing element. The flow length of the duct can have any length, but will generally be smaller than or equal to the length of the first closing element in longitudinal direction of the vehicle.

The air guide may comprise a porous turbulation member allowing air to flow through and to turbulate this flow of air, said turbulation member being attached on an upper end to the lower side of the first closing element. The turbulation member may be at least one of an air permeable net and open cell foam, attached on a lower end to the stationary part.

The stationary part, in an area at the front of the open roof construction, may at least be locally formed in a suitable shape to guide the airflow in a desired direction when said first closing element is in its upward position.

The air guide may be attached to the lower side of the first closing element in such a way that said air guide can be adjusted angularly so as to direct the air in different directions, in order to obtain the best result.

For this purpose, the first closing element may comprise a drive for the angular adjustment of the air guide, and the open roof construction may further comprise a control device, for the control of the drive during use of the open roof construction. This control may be done by the driver on the basis of the noise experienced, or done automatically, for example with the help of a microphone or sensor to measure the noise generated. The drive may also be a simple spring member moving, for example rotating, the air guide and keeping it pre-tensioned in open position of the first closing element and allowing the air guide to move back when the first closing element is closed. Such system could be used to reduce the packaging height in closed position of the first closing element.

The first closing element may be divided into at least two parts in transversal direction, so that two closing element parts side-by-side are created. Each part of the first closing element may be opened and closed individually and independent of each other.

Aspects of the invention also include a vehicle having the open roof construction as described above.

BRIEF DESCRIPTION OF THE DRAWINGS

Further details and advantages follow from the below description of the accompanying drawings showing embodiments of the open roof construction by way of example.

DETAILED DESCRIPTION OF THE ILLUSTRATIVE EMBODIMENTS

Figure 1:
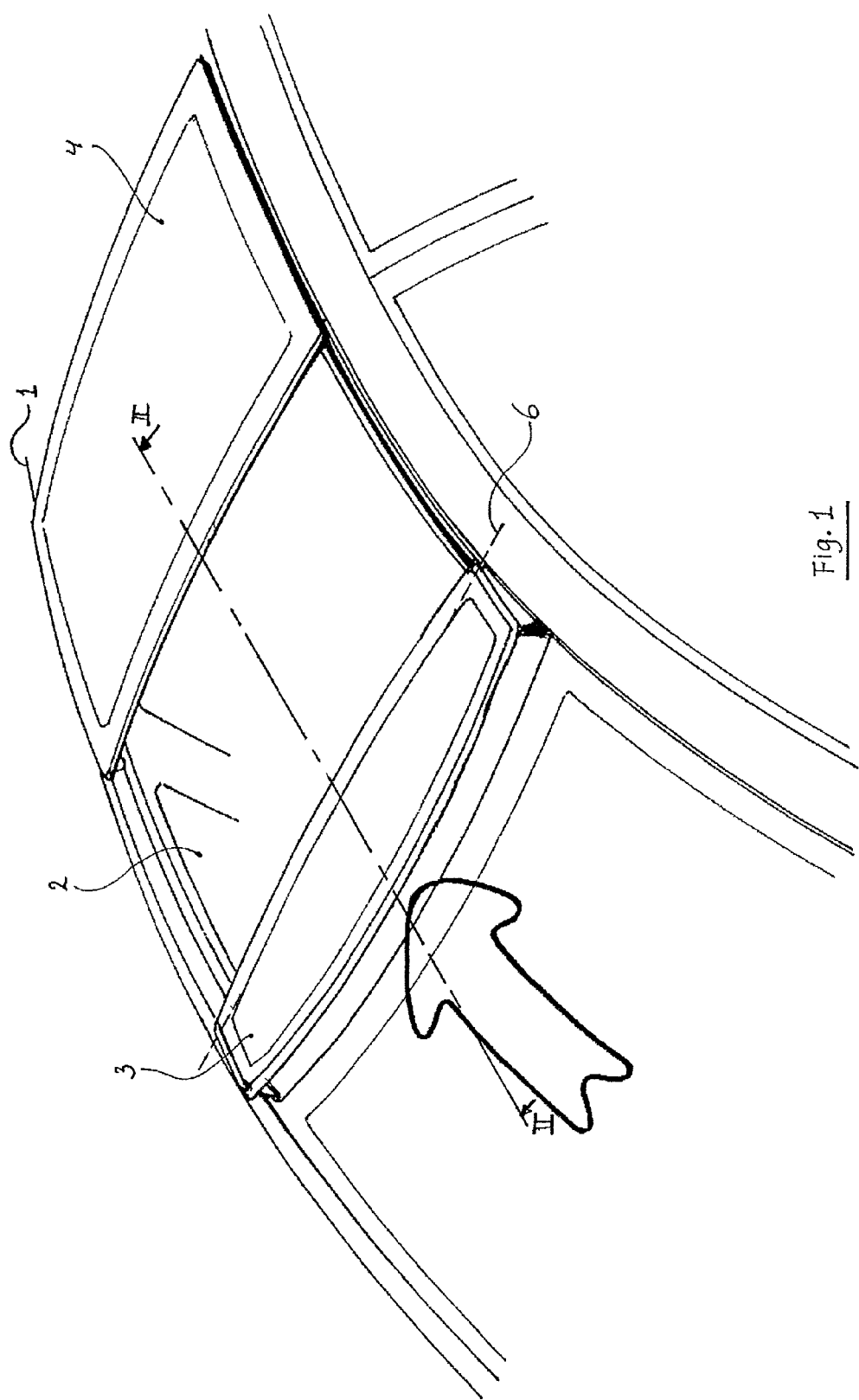
FIG. 1 is a schematic perspective view of a part of a vehicle having an embodiment of the open roof construction.

The drawing, and in the first instance FIG. 1, shows a vehicle, such as a passenger car, comprising a fixed roof portion 1, in which an opening 2 has been formed for the purpose of accommodating an open roof construction. The fixed roof portion 1 may be part of the vehicle or part of the open roof construction and replacing the normal roof of the vehicle. In this embodiment the open roof construction comprises a first closing element 3 and a second closing element 4 which may both be in the form of a rigid panel, which may or may not be transparent, and which together close the roof opening 2 in their closed position and which can be opened from said closed position. The second closing element 4 can in any case be opened by sliding the panel rearwardly over (FIG. 1) or under (FIGS. 2 and 3) the roof plate 1. Second closing element 4 may also be comprised of a foldable cover, slats or the like. The first closing element 3 will normally be adapted to the structure of the second closing element 4 in order to form a unit. The operating mechanism for the second closing element 4, which is not shown, does not form part of the present invention but are well known in the art.

The roof opening 2, which is relatively large, can be exposed to a large extent by second closing element 4, and in practice said relatively large opening may lead to the so-called "booming" problem, whereby resonances occur in a boundary layer (shaded area in FIG. 2) of air which is situated between the outside and the inside of the vehicle at the position of the roof opening 2 when said second closing element 4 is in its at least partly slid open position within the roof opening, i.e. between the wind flowing over roof opening 2 and the interior of the vehicle. In order to prevent this effect, the invention provides means for generating an air flow into this boundary layer to cause turbulence therein.

To create this effect the first closing element 3, which is situated in front of the second closing element 4 and above a front portion of the roof opening 2, is movably supported by a stationary part 5 of the open roof construction, such as a part of a frame. The first closing element 3 is capable of swiveling substantially around a lateral axis 6 which is positioned near and particularly below the rear end of the first closing element 3. The first closing element 3 can thus be moved with its frontal edge upwards to an upwardly inclined position so as to scoop air from an area in front of the vehicle roof when the vehicle is driving. The first closing element 4 may make a pure rotational movement, but may also make an additional translational movement, for example substantially in longitudinal direction of the vehicle.

Figure 4:
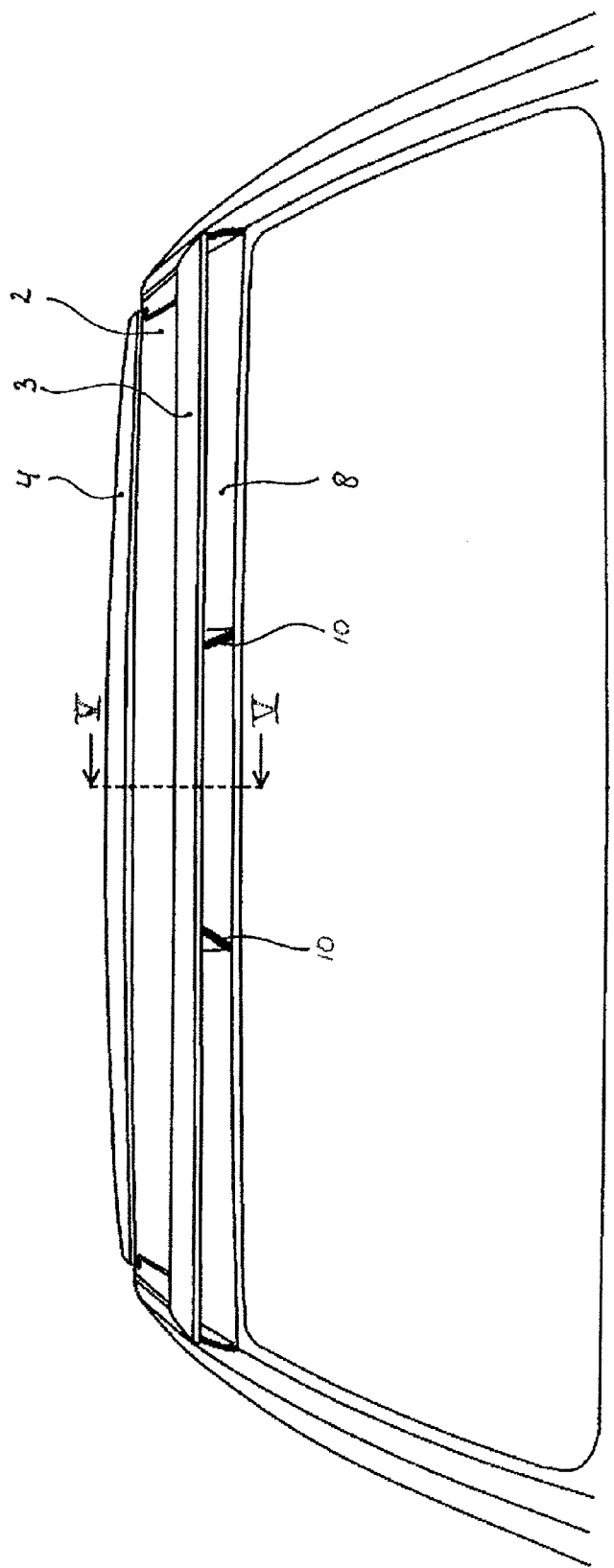
FIG. 4 is a frontal view of the vehicle showing the first and the second closing element according to the first embodiment.
Figure 5:
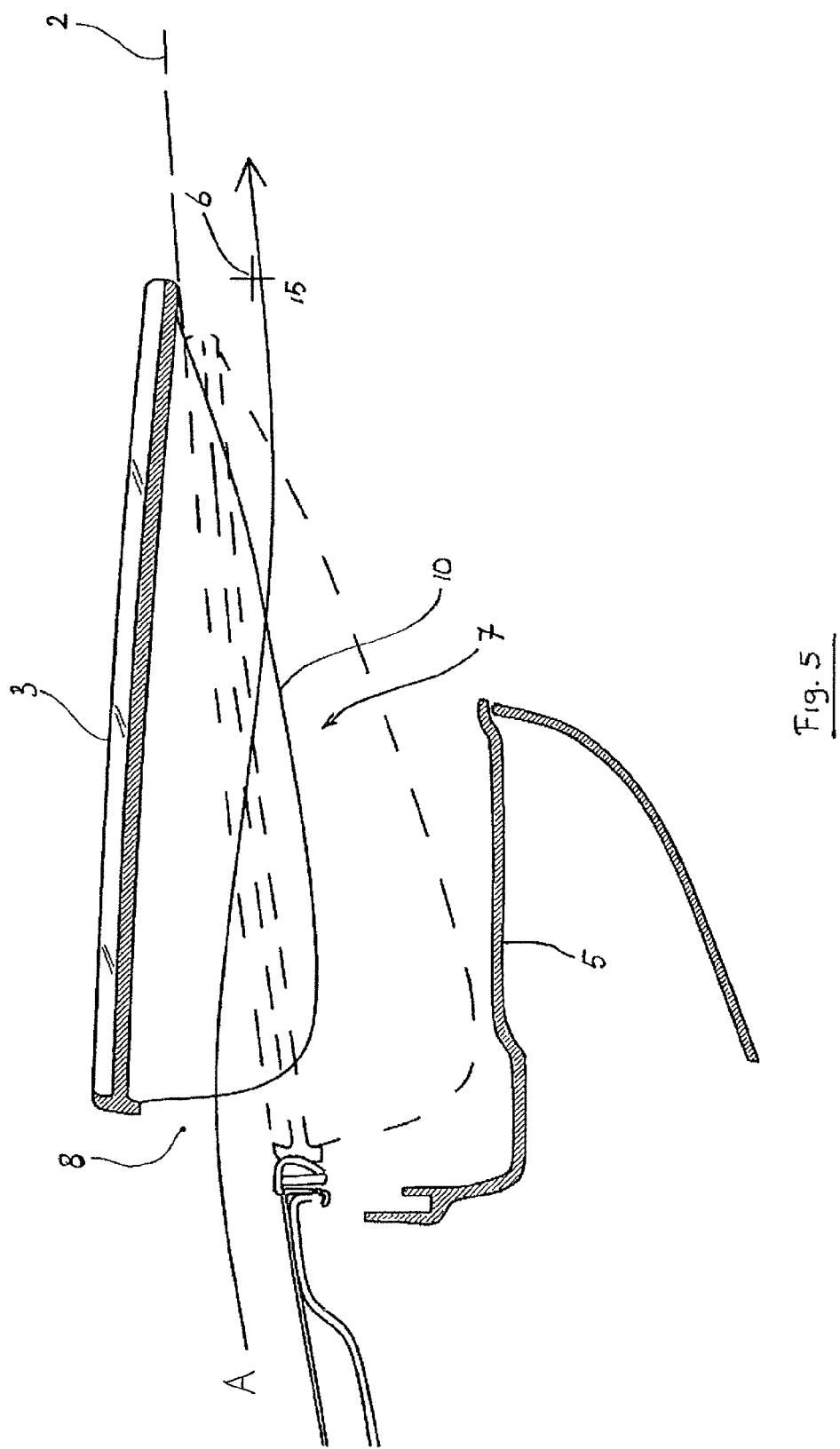
FIG. 5 is an enlarged sectional view according to line V-V in FIG. 4, showing the first closing element according to the first embodiment.

As is shown in FIGS. 4 and 5, the first closing element 3 is provided with an air guide 7 on its lower side to guide and direct the air caught by said first closing element 3 into the boundary layer in the roof opening 2 when the first closing element 3 is in its upward position during driving of the vehicle. The arrow A in FIGS. 2 and 5 indicates the air flow below the first closing element 3, and in this case between the first closing element 3 and a portion of the stationary part 5 that is situated below the first closing element 3. FIGS. 4 and 5 show the first closing element 3 in the open position. If the first and preferably also the second closing element 3, 4 is closed (closed position according to the hatched lines in FIG. 5) the air flow can flow over the closed closing elements 3, 4 without impediment.

When the first closing element 3 has moved to its upward position, an inlet 8 is formed on the front side thereof, which inlet 8 first extends approximately horizontally and which scoops air into a flow channel, as it were. The air guide 7 then guides and directs the air in the desired direction.

Figure 6:
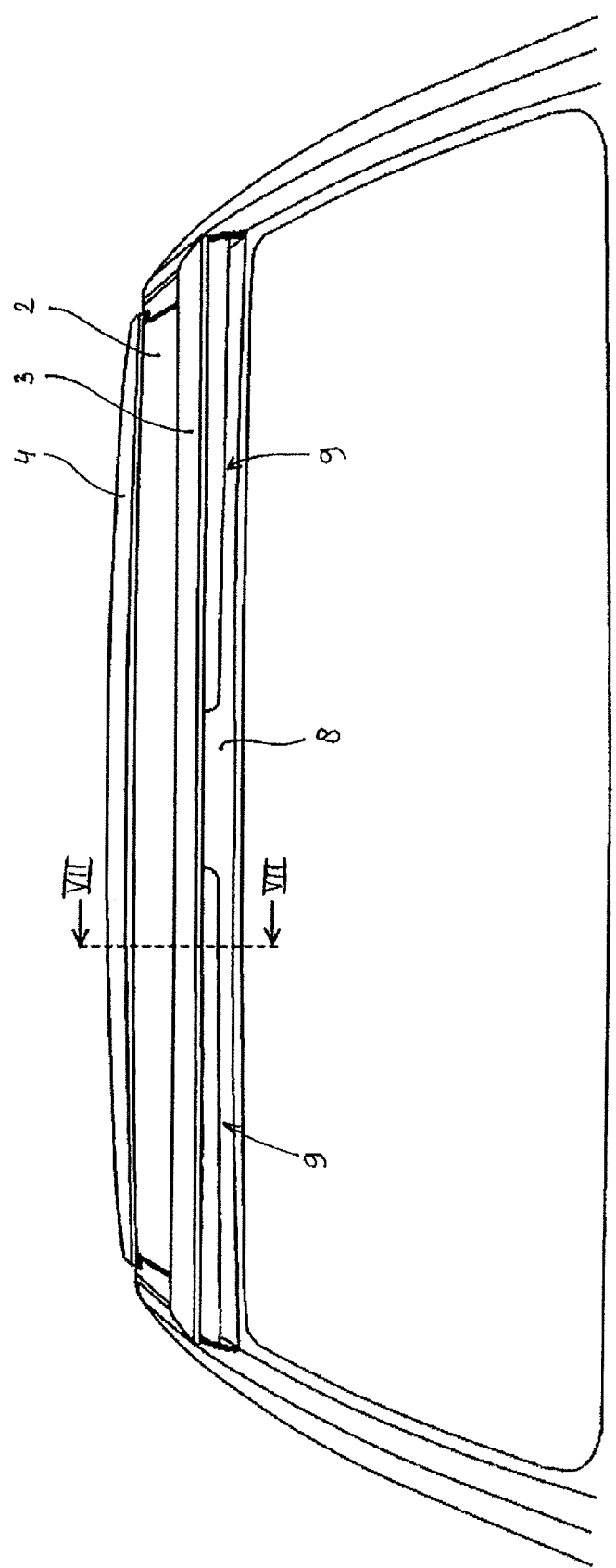
FIG. 6 is a frontal view of the vehicle showing the first and the second closing element according to a second embodiment.
Figure 7:
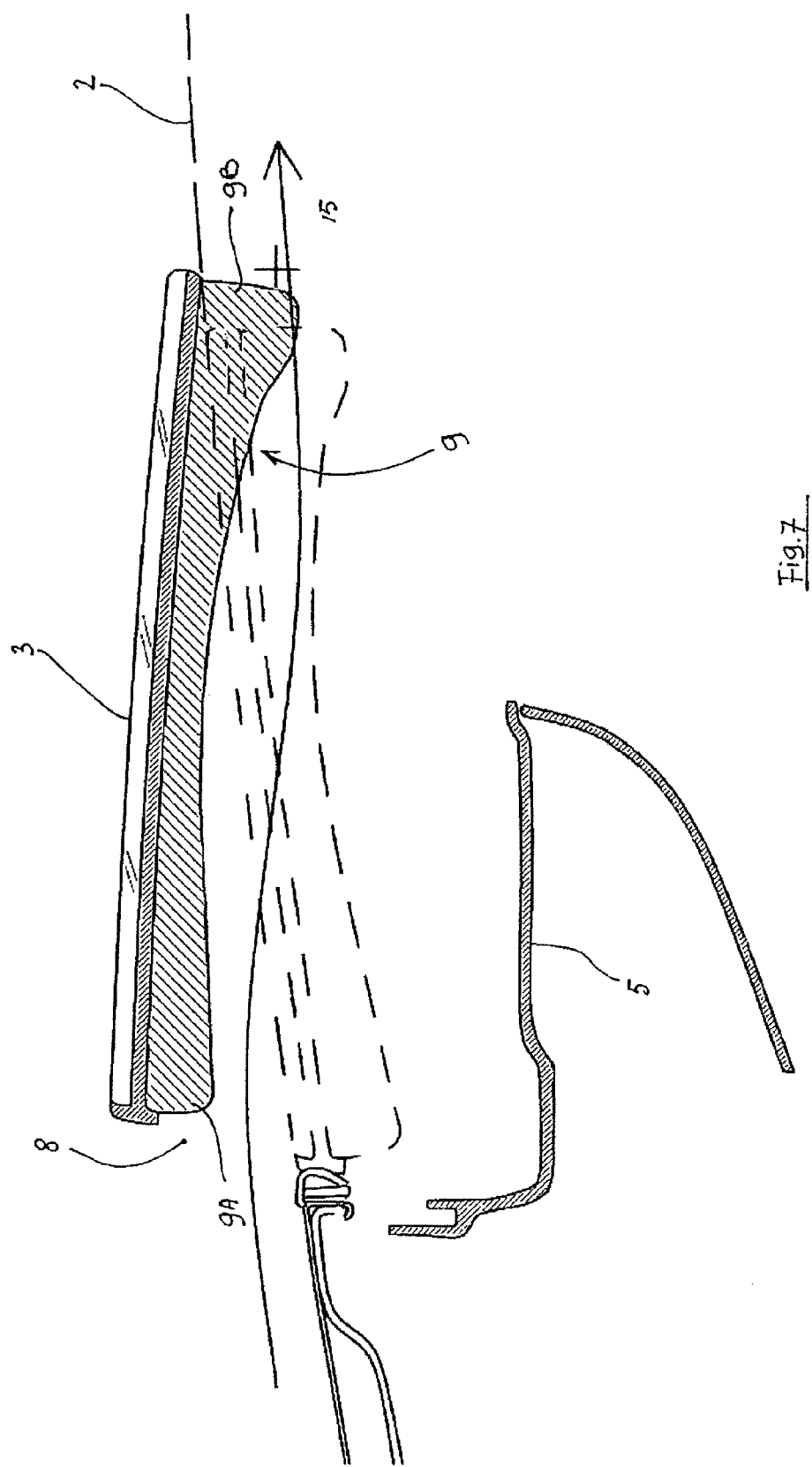
FIG. 7 is an enlarged sectional view according to line VII-VII in FIG. 6.
Figure 8:
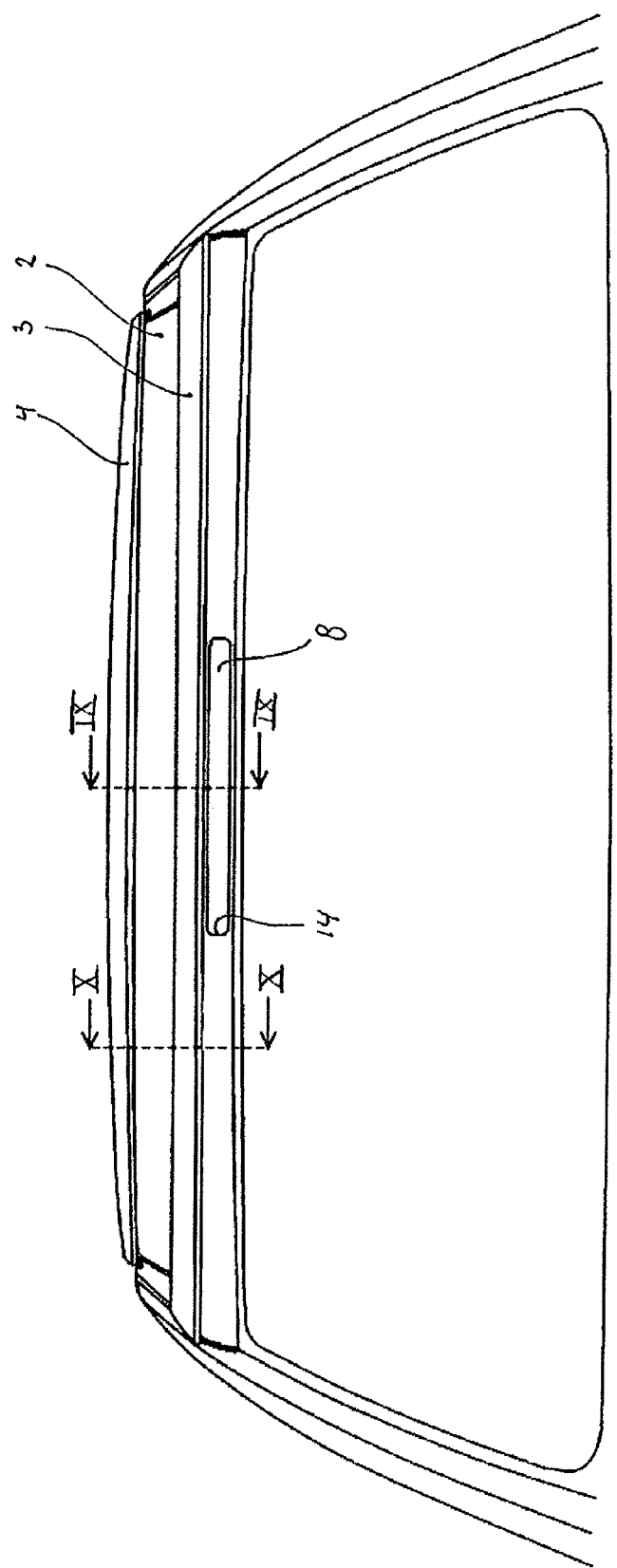
FIG. 8 is a frontal view of the vehicle showing the first and the second closing element according to a third embodiment.
Figure 10:
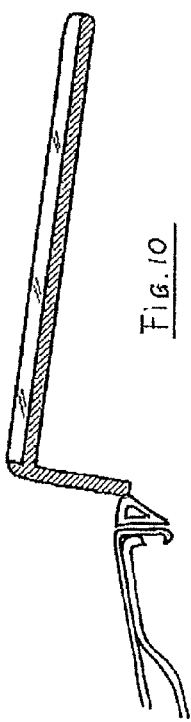
FIG. 10 is an enlarged sectional view according to line X-X in FIG. 8.
Figure 9:
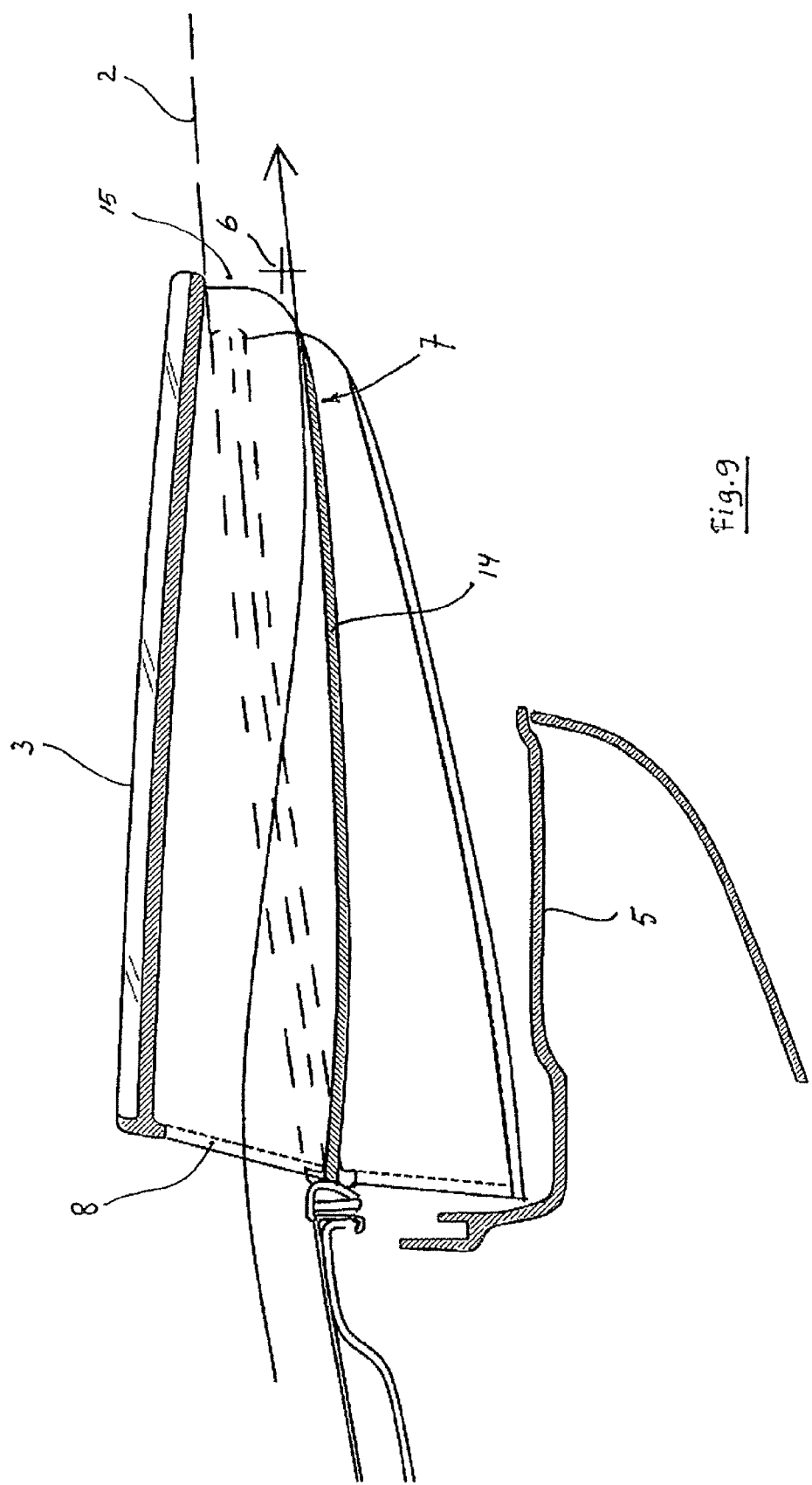
FIG. 9 is an enlarged sectional view according to line IX-IX in FIG. 8, showing the first closing element according to the third embodiment.

In the second embodiment of FIGS. 6 and 7, the air guide 7 comprises at least one solid body 9, and in this case two solid bodies 9A and 9B, projecting downward from the lower side of the first closing element 3. The solid bodies 9A, 9B are formed as an integral part of the first closing element 3 or are attached thereto, for example by encapsulation, as is shown. In this embodiment, the first solid body 9A is formed near the front edge of the first closing element 3, the second solid body 9B near the rear edge thereof. Each of the first and second solid bodies 9A, 9B may be connected by a intermediate solid body having a shape such that it smoothly connects the shape of the first and second body 9A, 9B, as is shown in FIG. 7. The first and second solid bodies 9A, 9B may however also be remain separately. Side guides or baffles may be used to influence the air flow A in lateral direction.

Figure 13:
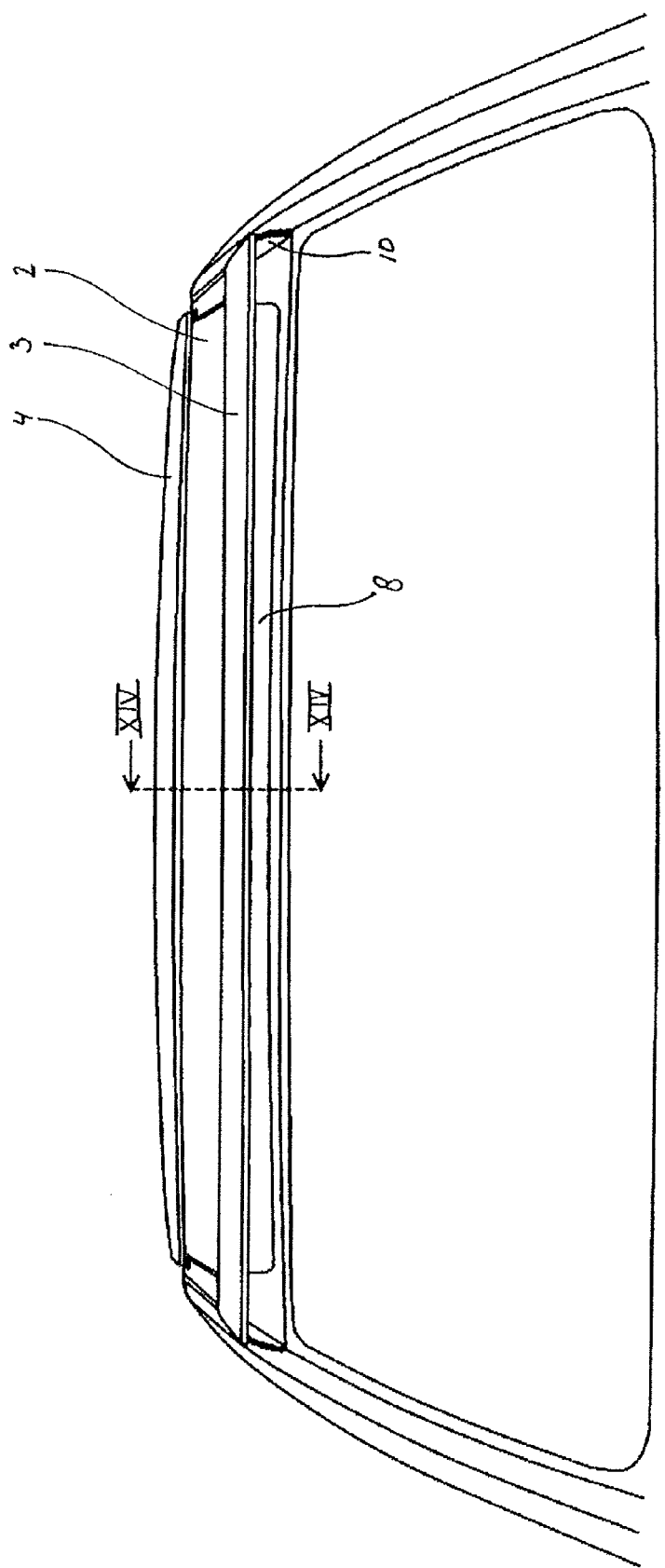
FIG. 13 is a frontal view of the vehicle showing the first and the second closing element according to a fifth embodiment.
Figure 14:
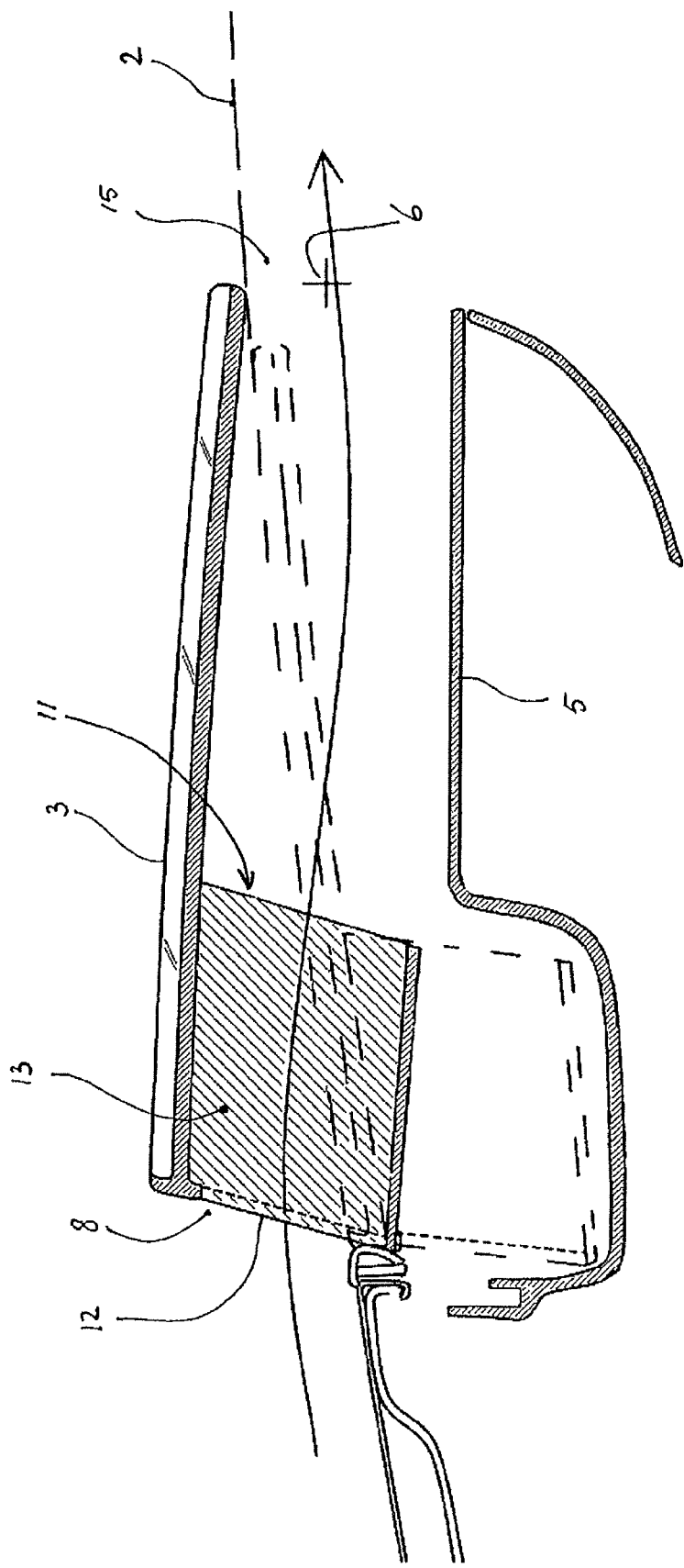
FIG. 14 is an enlarged sectional view according to line XIV-XIV in FIG. 13, showing the first closing element according to the fifth embodiment.

FIGS. 13 and 14 show another embodiment of the air guide 7. A porous turbulation member 11 is attached to the lower side of the first closing element 3, allowing air to flow through and to turbulate this flow of air when said first closing element 3 is in its upward position. The turbulation member 11 is attached on an upper end to the lower side of the first closing element 3 and substantially seals on an a lower end to the stationary part 5, such that all air flowing between the first closing element 3 and a solid plate bottom of the turbulation member 11, must flow through the turbulation member 11. In the embodiment shown, the turbulation member 11 includes netting 12 on the inlet side and open cell foam 13 downstream thereof. The turbulence created by this turbulation member 11 further decreases the booming effect. The turbulation member 11 shown in FIGS. 13 and 14 may be attached to the lower side of the first panel 3, in the shape of a cassette, whereby the porous material is held in the cassette, and the frontal side and the rear side of the cassette is open for air to flow though the porous material.

The turbulation member 11 in the embodiment shown may be deformable to enable the first closing element 3 to move between the open and closed positions. However, the turbulation member 11 may also be movably arranged to allow closure of the first closing element 3, or may move into a recess of the stationary part (as shown in FIG. 14) or behind the stationary part 5 by means of guiderails or the like. The turbulation member 11 may also be used in combination with the solid body or bodies 9A, 9B, or in combination with other embodiments of the air guide 7.

The turbulation member 11 may extend the whole transverse and/or longitudinal width of the first closing element 3, or just a part thereof where it is most effective. The turbulation member is attached to the first closing element 3, but might have a distance to the stationary part 5.

FIGS. 8, 9, 10, 11 and 12 show two further embodiments in which the air guide 7 comprises at least one duct 14 for guiding and directing the air. The duct 14 projecting downward from the lower side of the first closing element 3 but extends substantially parallel to the first closing element 3. The first closing element 3 forms the upper side of the flow duct 14. The air enters the duct 14 at the inlet 8 and leaves the flow duct 14 again at an outlet 15. The outlet 15 will direct the air in a desired direction or the air will flow through the outlet 15 already in the desired direction by the shape of the duct 14. The width of the flow duct 14 may be constant or may vary to create certain effects. For example, if the width and/or height decreases in the direction of flow, a venturi effect is created in flow duct 14, whereby the velocity of the inflowing air is increased, so that air flows out at a higher velocity at outlet 15 then it entered at the inlet 8. On the other hand, it is also possible to create a flaring duct so that the air velocity and therefore the noise will decrease. The lower side of the duct 14 may be integrated with the lower side of the first closing element 3

Figure 11:
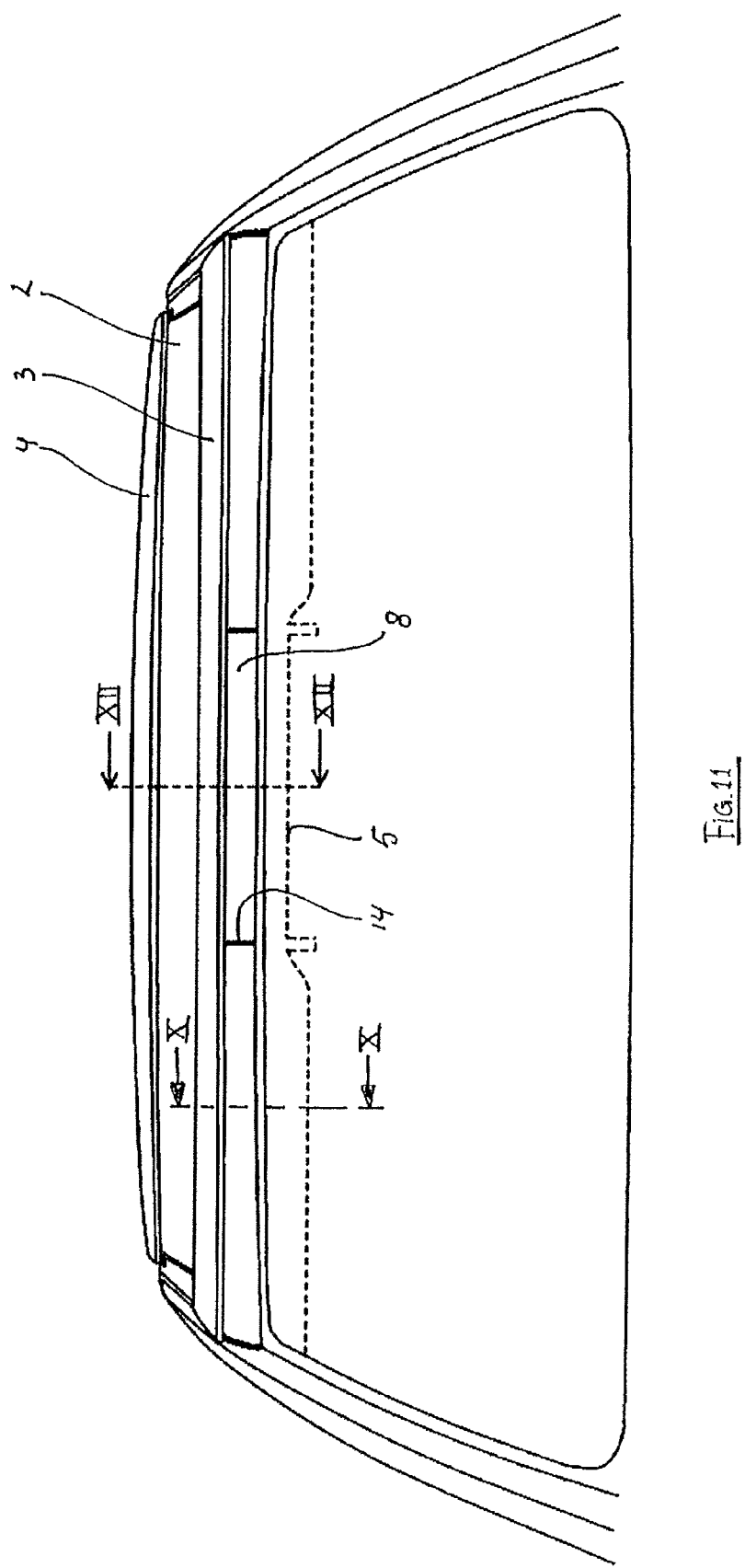
FIG. 11 is a frontal view of the vehicle showing the first and the second closing element according to a fourth embodiment.
Figure 12:
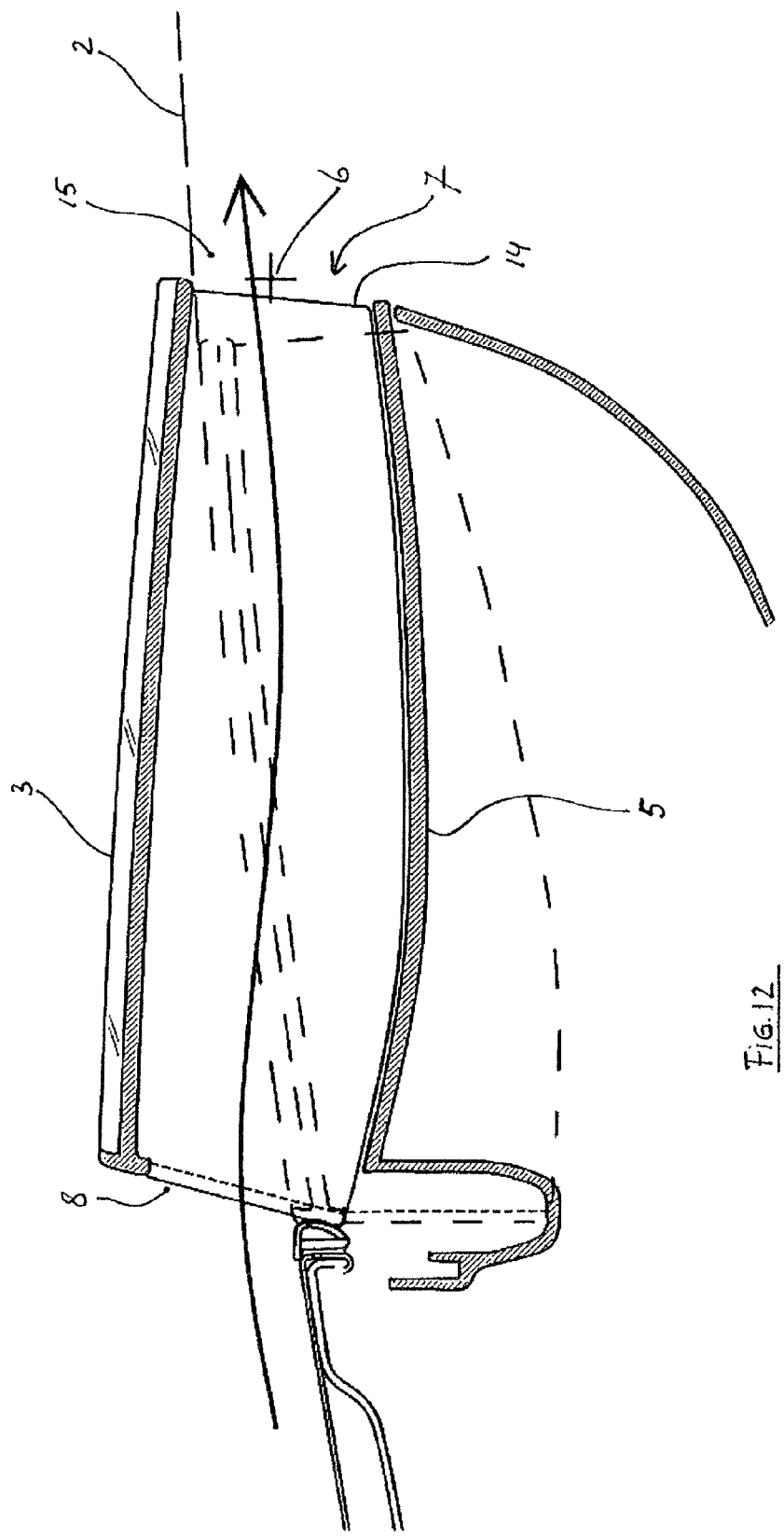
FIG. 12 is an enlarged sectional view according to line XII-XII in FIG. 11, showing the first closing element according to the fourth embodiment.

However, as shown in the embodiment of FIGS. 11, 12 the lower side of the duct 14 may also be formed by the stationary part 5, whereby said part has a suitable shape for directing the air in an optimal direction at least in an area of the width of the duct 14. In the retracted or closed position of first closing element 3, the duct 14 will be retracted too, in a space created by the stationary part 5.

The flow duct 14 may extend over only a part of the width of the roof opening 2, which may be sufficient to prevent the "booming" effect. The flow may be given a greater width, or several first closing element parts may be formed in side-by-side relationship. The space beside the duct 14 will normally be blocked (see FIGS. 8 and 10) so that the air is either guided through the duct 14 or laterally away from the roof opening 2 by a blocking member which will normally have an aerodynamic (convex) shape.

Instead of using an upwardly pivoting first closing element 3, it is also possible to open the inlet 8 in a different manner, for example by upward rotation and sliding the first closing element 3 in rearward direction and/or by sliding away a closure or the like. Preferably, the construction is selected so that the appearance of the vehicle is affected as little as possible, in any case in the inactive position of the arrangement. First closing element 3 and/or the air guide 7 attached to it is preferably adjustable, e.g. swivable or rotatable, by means of an electric motor or other drive, for example the drive of the second closing element 4, or a torsion spring. Also it is possible, for example, to build a small electric motor 20 (FIG. 18) into the first closing element itself. An electric control makes it possible to adjust the first closing element 3 and/or the air guide 7 depending on the position of first and/or second closing element 3, for example, so that it is possible to generate an optimally advantageous air flow into the boundary layer in any position of the second closing element 4.

Figure 15:
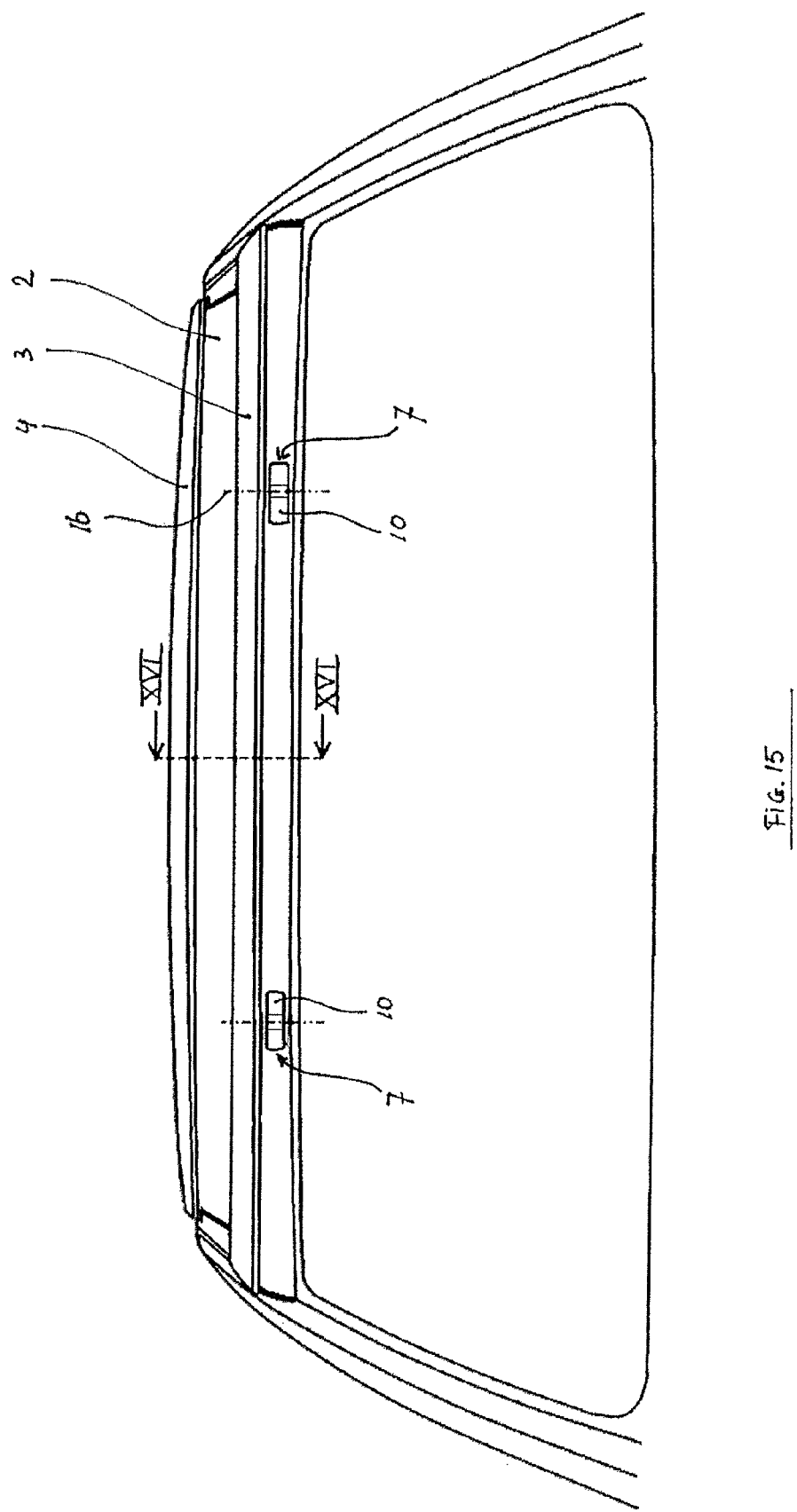
FIGS. 15 and 16 are respectively a frontal view of the vehicle showing the first closing element according to a sixth embodiment, and an enlarged sectional view according to line XVI-XVI in FIG. 15.
Figure 16:
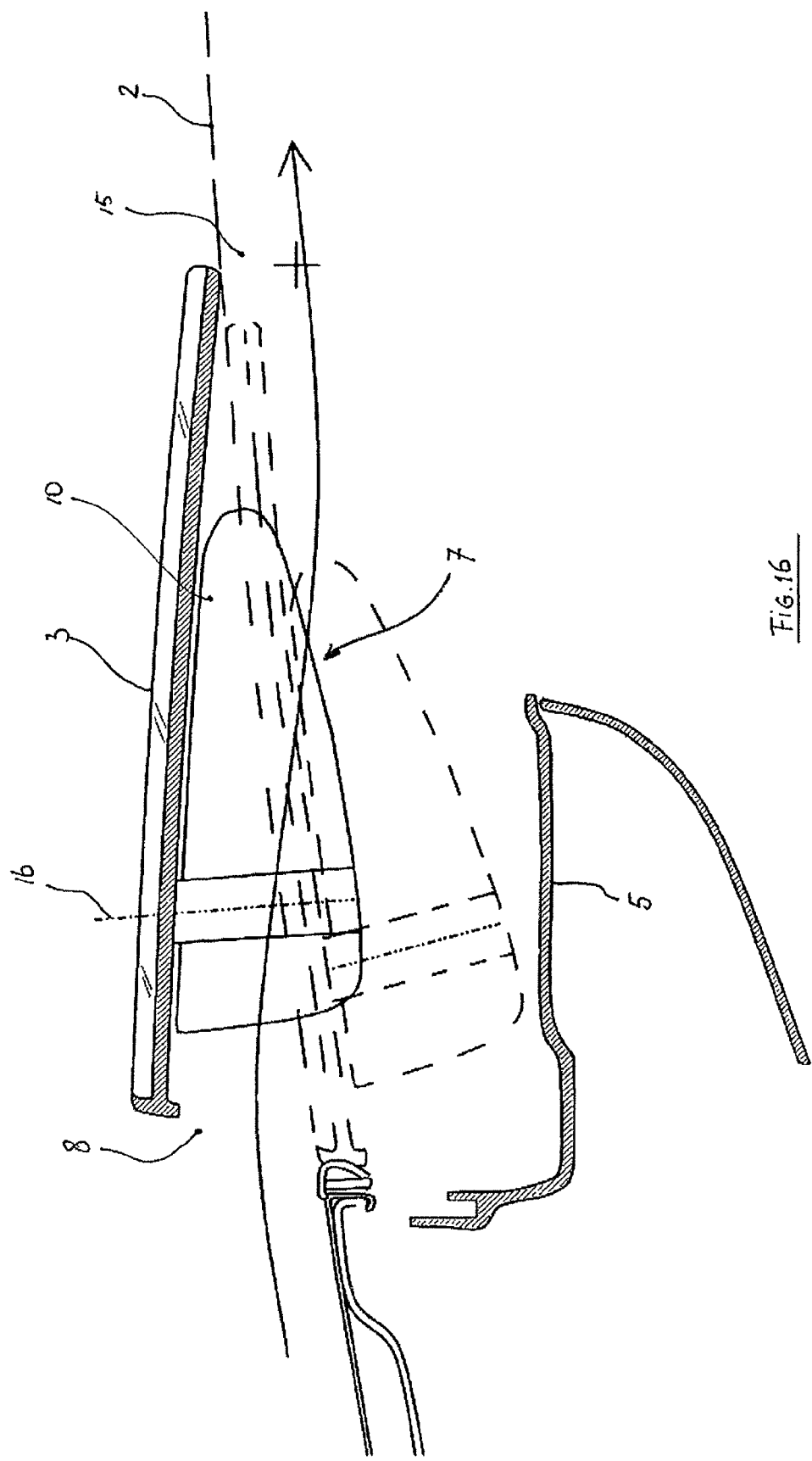

FIGS. 15 to 21 show embodiments wherein the solid body or baffle 10 of the air guide 7 is rotatably attached to the lower side of the first closing element 3. In FIGS. 15 and 16 it is shown that the axis of rotation 16 of the two solid baffles 10 of the air guide 7 are substantially perpendicular to the first closing element 3, such that the baffles 10 of the air guide 7, which are provided only locally in transverse direction as seen in FIG. 15 and have a rounded shape, are able to correct the direction of air laterally.

Figure 17:
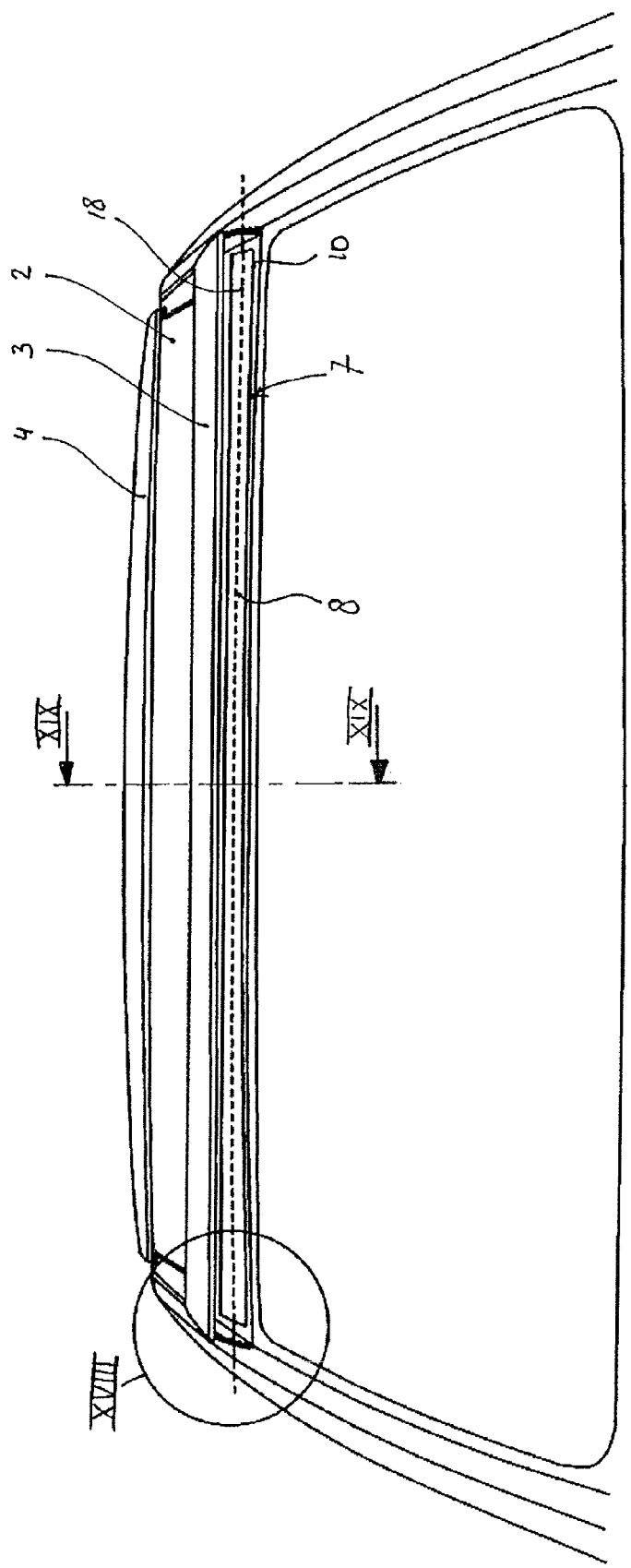
FIGS. 17, 18 and 19 are respectively a frontal view of the vehicle showing the first closing element according to a seventh embodiment of the air guide, an enlarged view of a part of the first closing element according to detail XVIII in FIG. 17, and an enlarged sectional view according to line XIX-XIX in FIG. 17.
Figure 18:
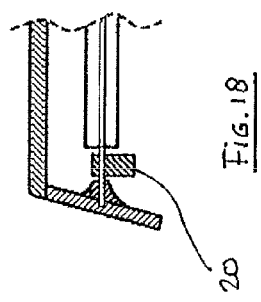
Figure 19:
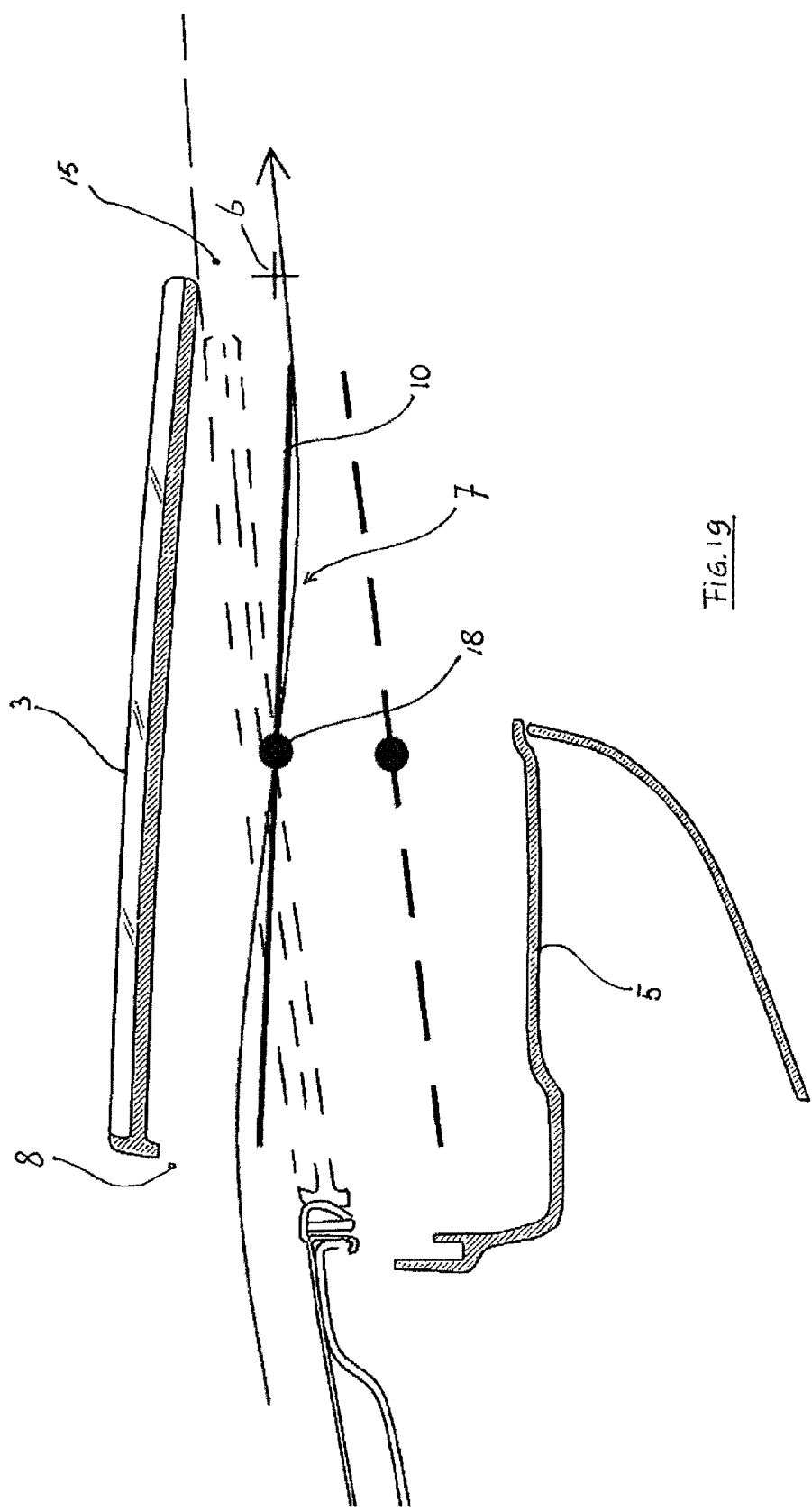

FIGS. 17, 18 and 19 show that the pivot axis 18 of the baffle 10 of the air guide is substantially in transverse direction, i.e. substantially horizontally, hence the air guide 7 is able to correct the direction of air in a vertical direction. Here the baffle 10 of the air guide 7 is plate shaped with its main plane substantially parallel or at a small angle to the lower side of the first closing element 3 and extends substantially the full width of the first closing element 3.

Figure 20:
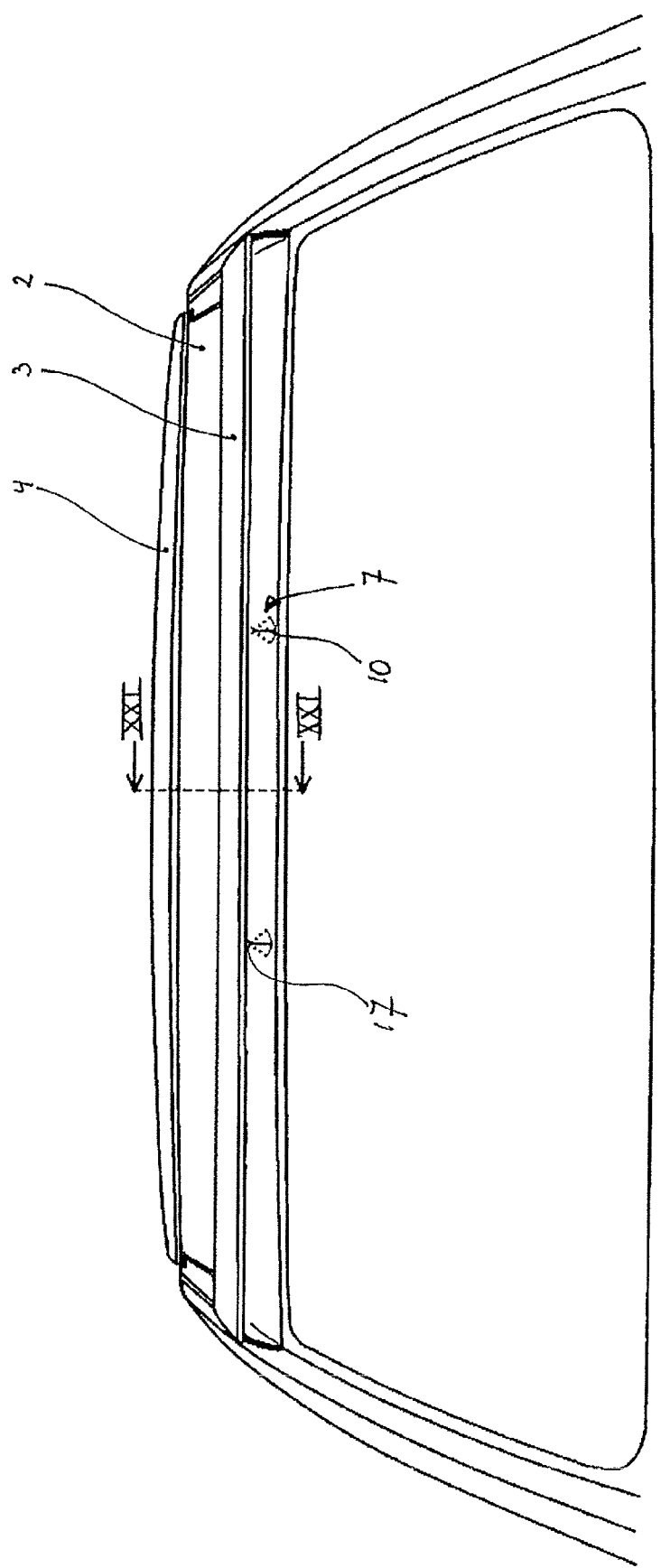
FIGS. 20 and 21 are respectively a frontal view of the vehicle showing a first closing element according to an eighth embodiment of the air guide, and an enlarged sectional view according to line XXI-XXI in FIG. 20.
Figure 21:
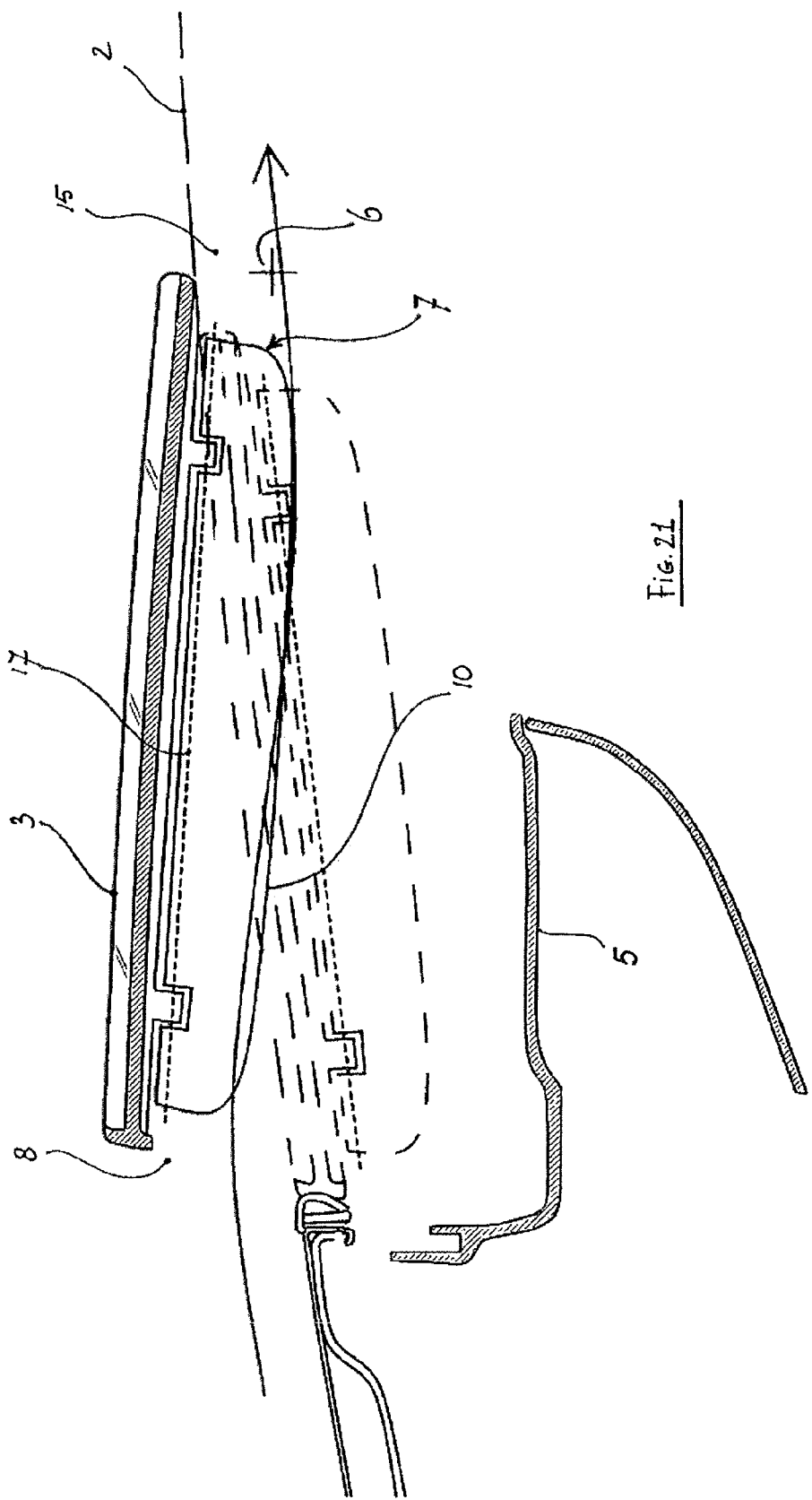

In another embodiment shown in FIGS. 20 and 21 the pivot axes 17 of the baffles 10 of the air guide 7 are positioned substantially in longitudinal direction, i.e. in this case parallel to the upper side of the first closing element 3, thereby having a small lateral angle, such that the baffles 10 are able to correct the direction of air in a vertical and lateral direction. In this case, the air guide 7 includes a plurality (in this case two) of plate shaped baffles 10 extending downward from the first closing element 3 and with its length substantially parallel to the direction of flow of the air. The plate shaped bodies 10 of the air guide 7 are positioned at a distance from each other and from the sides of the closing element 3 and symmetrically with respect to a central vertical plane through the vehicle. Other arrangements are conceivable.

Furthermore it is possible to link the position of the first closing element 3 and/or guide element 7 to the velocity of the vehicle or to measurements of the noise generated by the booming effect. Such measurement may be done with use of a microphone or a sensor 21 positioned in the vehicle as shown in FIG. 2.

Figure 2:
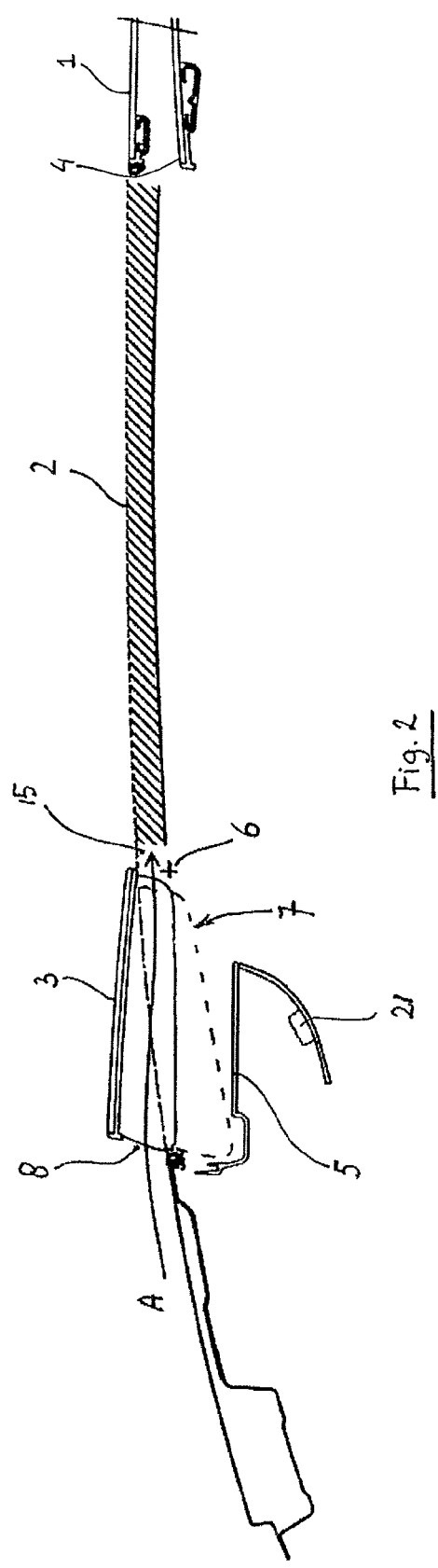
FIG. 2 is a first part of an enlarged sectional view according to the line II-II in FIG. 1 showing a first closing element according to a first embodiment.
Figure 3:
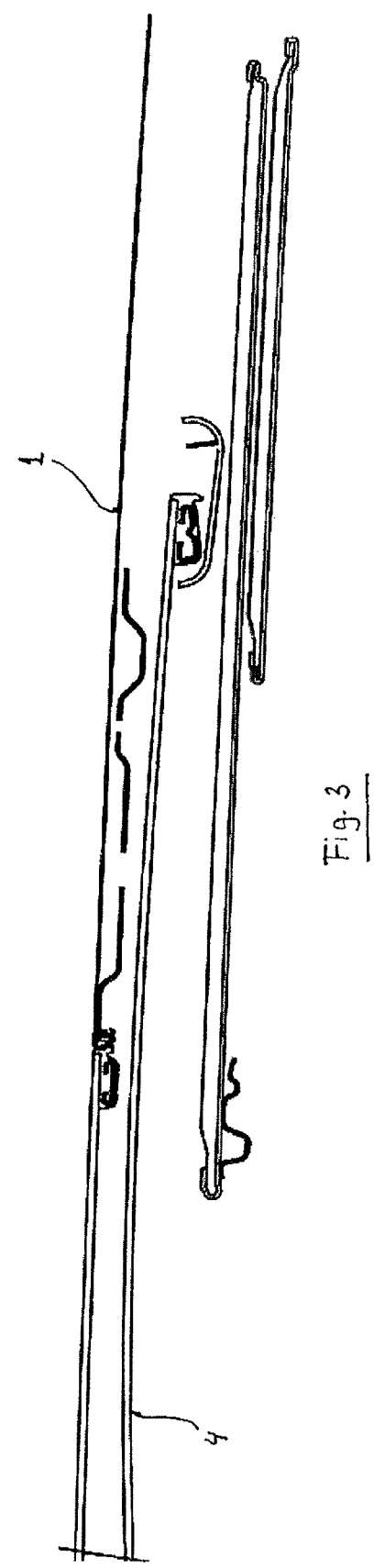
FIG. 3 is a second part of an enlarged sectional view according to the line II-II showing a second closing element in an open position retracted under the fixed roof portion.
Figure 22:
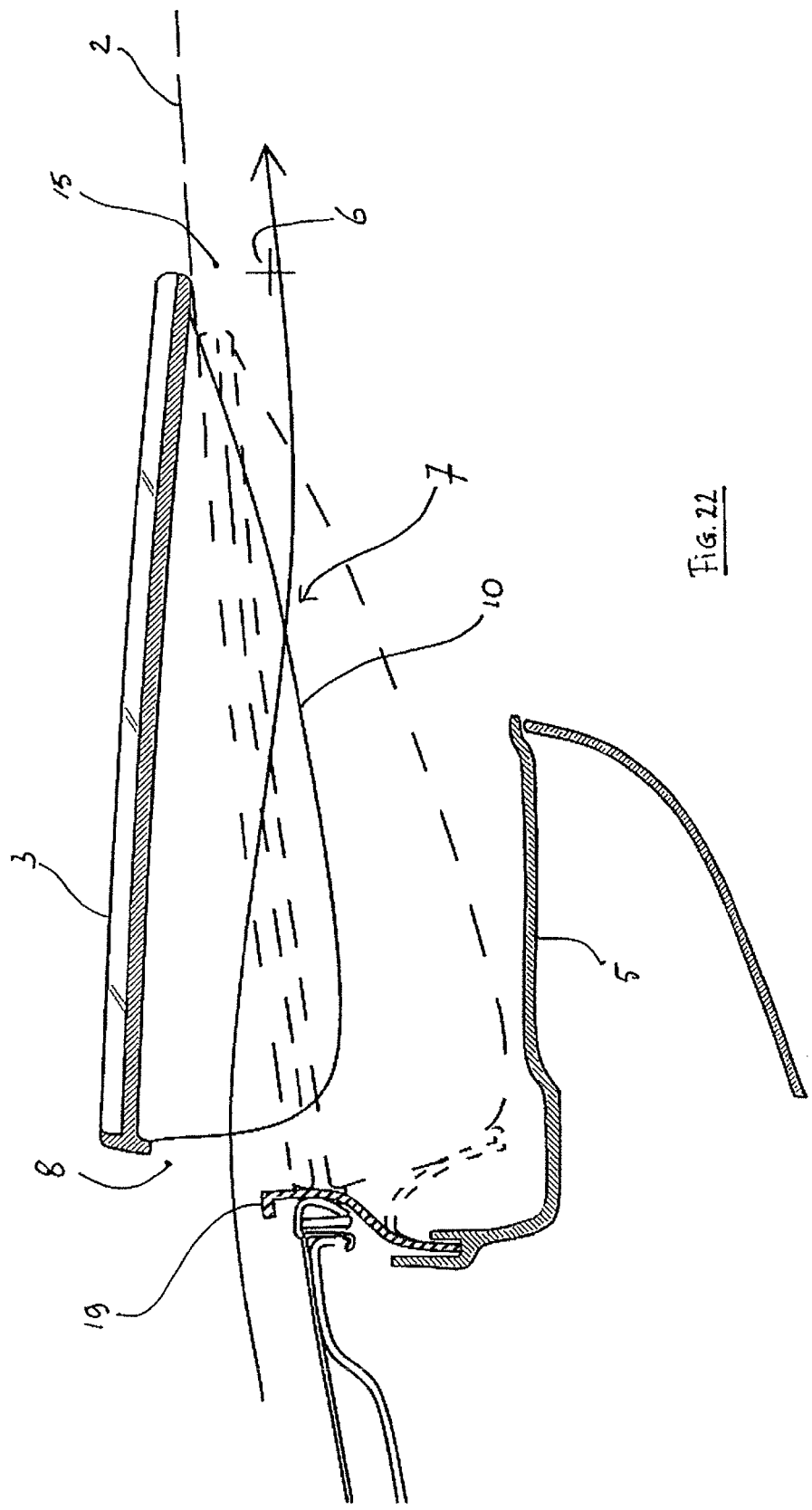
FIG. 22 is a sectional view according to that of FIG. 5, but with the addition of a means to avoid water entrance.

In the embodiment of FIGS. 2 and 3, but this may also be true for the other embodiments, the second closing element 4 is part of a tilt-sliding roof, in which the second closing element 4 is a glass or other transparent panel that can be moved from the closed position to a rearwardly inclined venting position on the one hand and down and rearwardly below the fixed roof portion on the other hand. The first closing element 3 closes the front portion of the roof opening 2 in its inactive position, and can be swiveled upwardly and moved slightly rearwardly to an active position. The stationary part 5, in an area at the front of the open roof construction, is at least locally formed in a suitable shape to guide the airflow in a desired direction when said first closing element 3 is in its upward position. In FIG. 22 it is shown how, in the event of the first closing element 3 being in the open position and having a wet vehicle under driving circumstances, drops of water can be caught by a flexible element 19, to prevent water from entering into the vehicle. The flexible element 19 is in upright position when the first closing element is in its open position and thus protrudes upwardly from the fixed roof portion 1 in front of the first closing element to catch water from the fixed roof portion and draining it away to the sides. When said the first closing element 3 moves to its closed position, the flexible element 19 is flexibly deformed and brought into an inactive position by the front edge of the first closing element 3 or by the front of the air guide, as is shown by dashed lines in FIG. 22.

Figure 23:
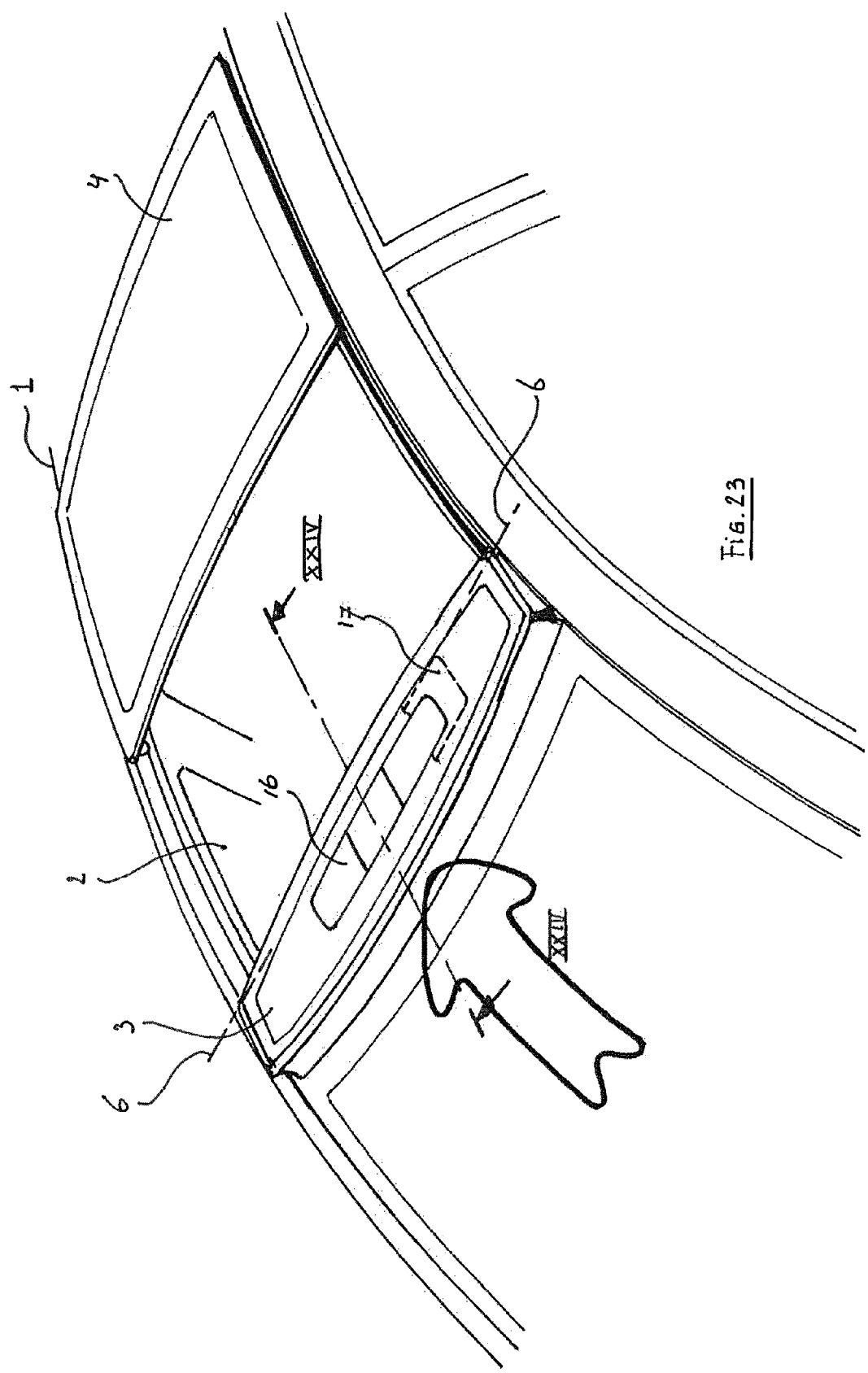
FIG. 23 is a schematic perspective view corresponding to that of FIG. 1, but showing a vehicle having a ninth embodiment of the open roof construction.
Figure 24:
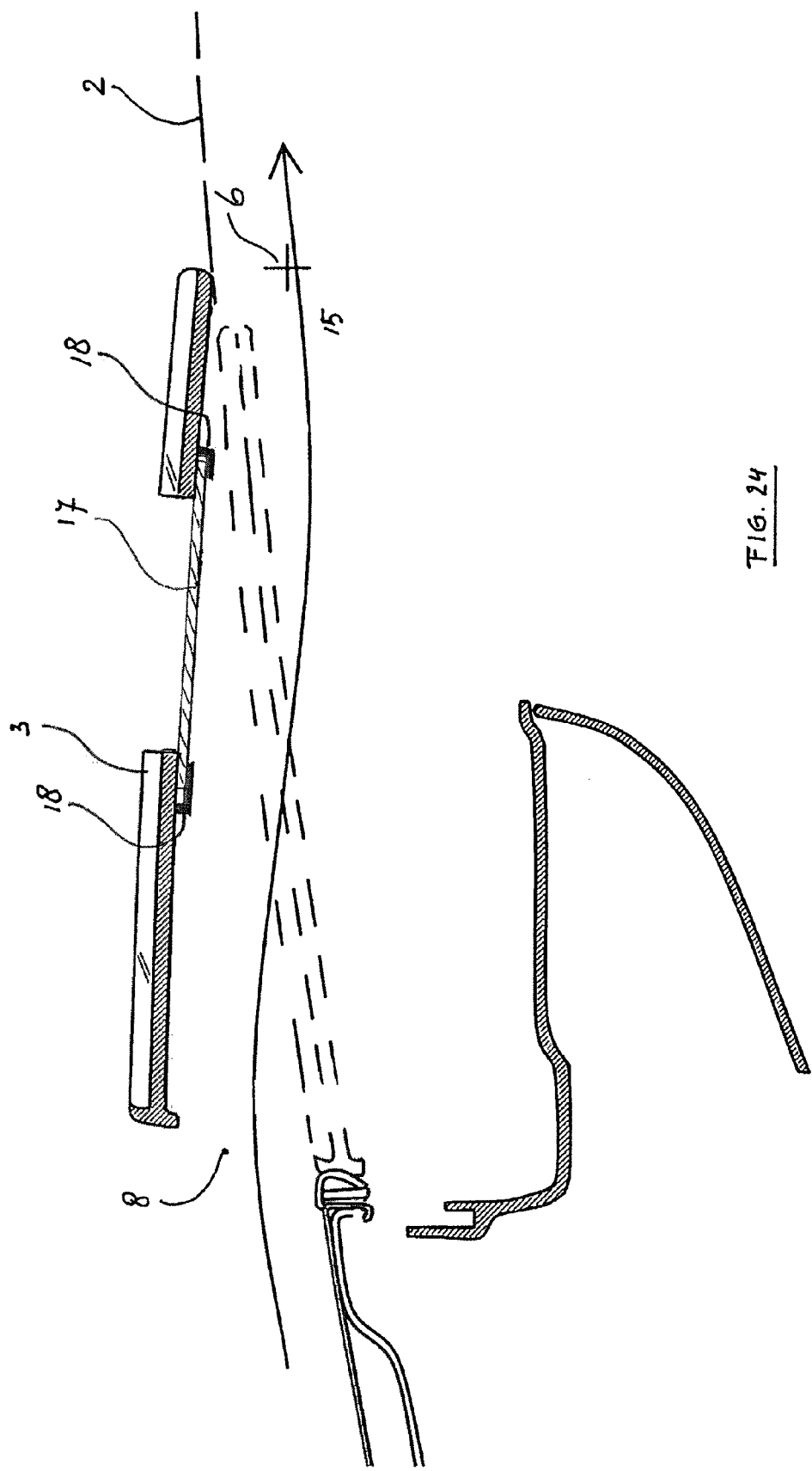
FIG. 24 is cross sectional view according to the line XXIV-XXIV in FIG. 23.

FIGS. 23 and 24 show a further embodiment in which the first closing element 3 comprises an opening 16 which provides a passage between the upper and lower side of the first closing element 3. In this embodiment, the opening 16 cannot only be opened and closed, but the size of the opening 16 can also be adjusted, in this case by two slides 17 which are slidable in guides 18 extending in transverse direction of the open roof construction. The adjustment can be done manually, but also an automatic adjustment is possible, for example on the basis of vehicle speed or noise generated. The opening allows air to flow through the opening 16 to reduce dynamic air pressure differences between areas below and above the first closing element 3, but still allow an air flow to be guided into the boundary layer. The opening 16 might be closed by other types of closures, which may be positioned within, above or below the opening 16, and may slide, rotate and/or fold. As in the other embodiments, the first closing element will be raised from the closed to the open position if the second closing element is moved, e.g. slid rearwardly, from its closed to its (partly) open position. This can be done manually or automatically.

Figure 25:
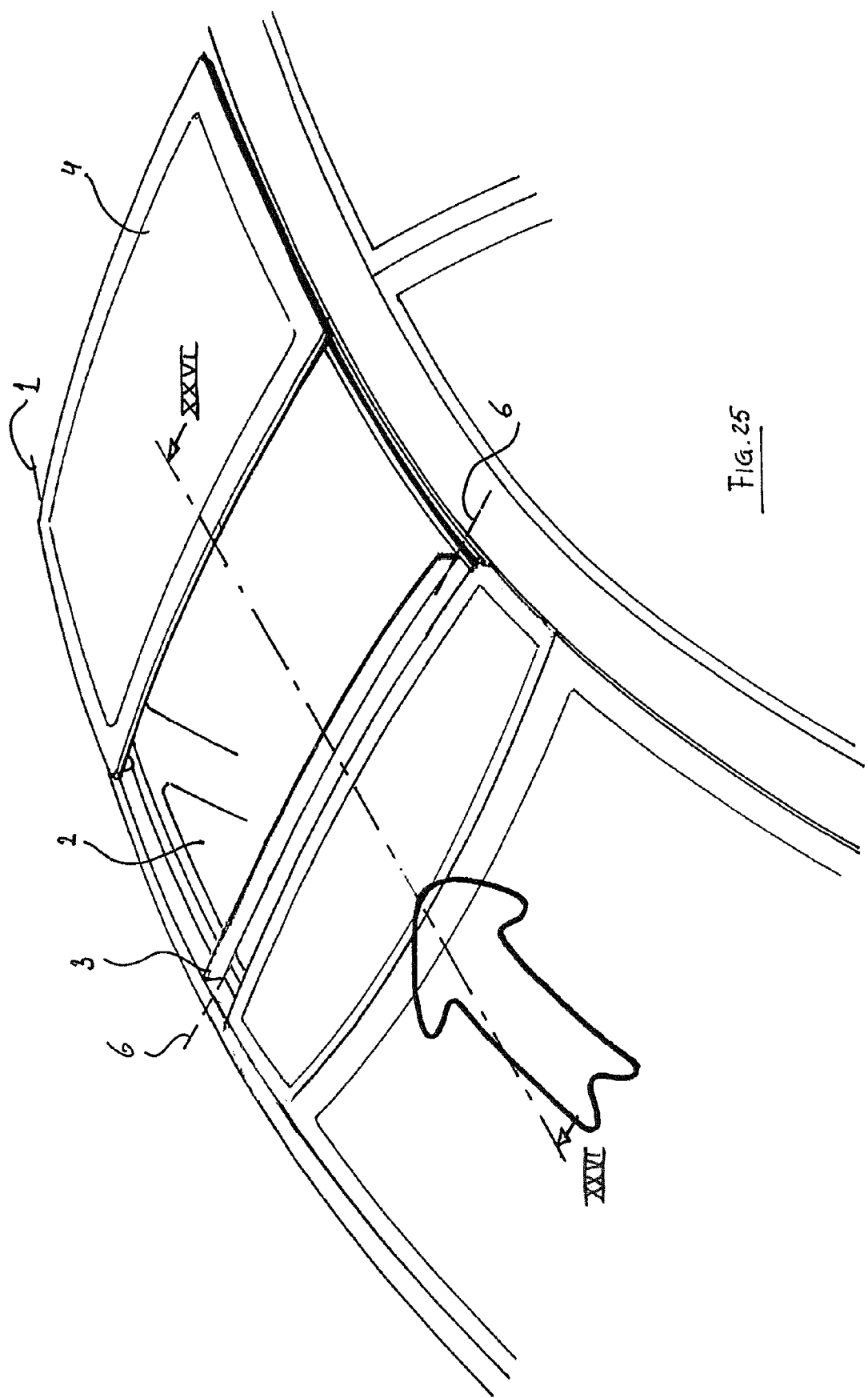
FIGS. 25 and 26 are views corresponding to that of FIG. 23, 24, respectively, but showing a tenth embodiment of the open roof construction.
Figure 26:
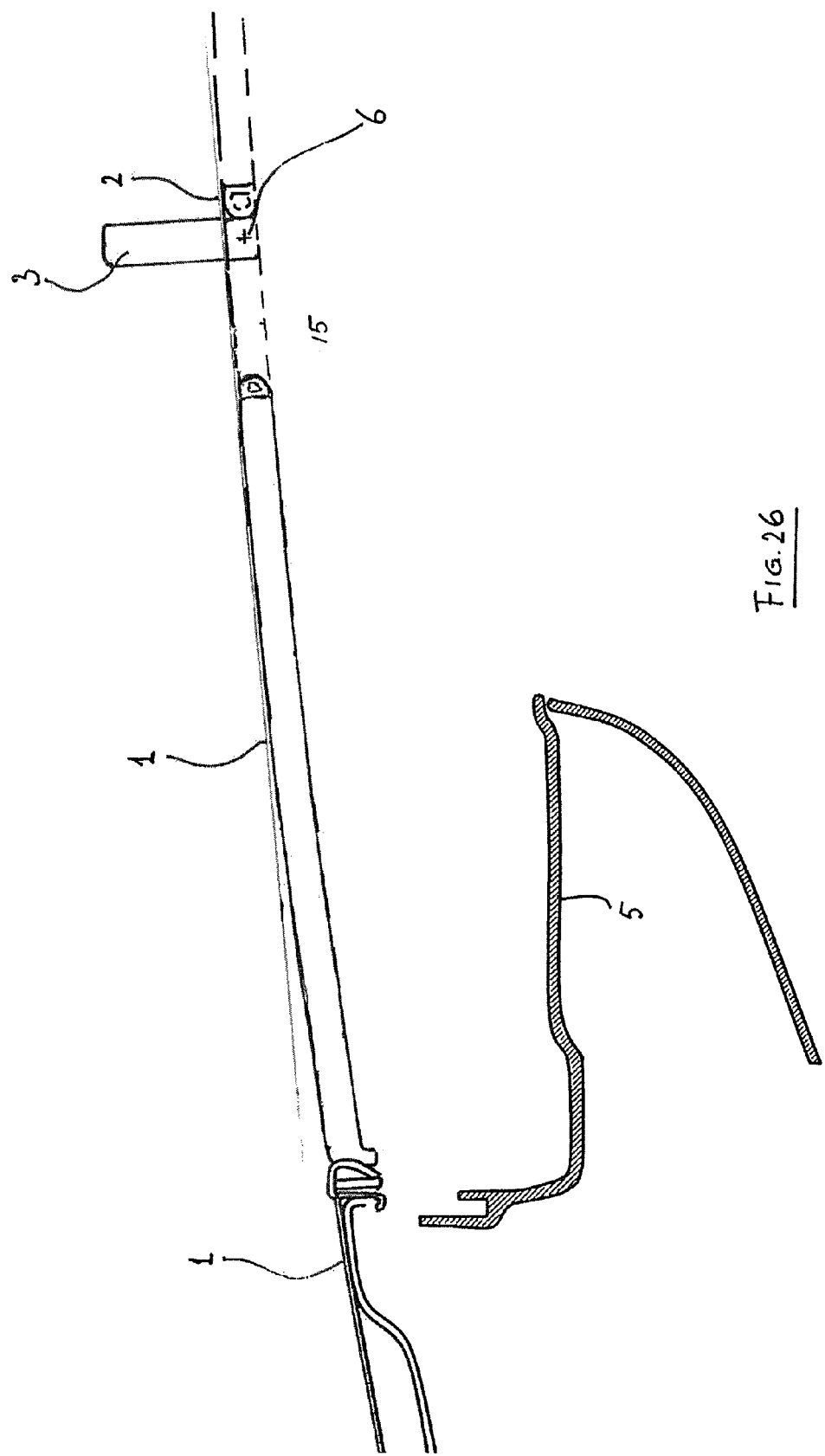

FIGS. 25 and 26 show a tenth embodiment, in which the panel that was the first closing element 3 in the former embodiments, is now a fixed panel, or it can even be part of the fixed roof 1. The first closing element 3 is now a small panel positioned in the front part of the roof opening 2 and extending the full width of the roof opening 2. In its closed position, it closes a first front part of the roof opening 2, while the second closing element 4 closes a second, in this case rear, part of the roof opening 2. The length of the first closing element 3 in longitudinal direction of the open roof construction (when in closed position) is for example between 1 and 10 cm, and more particularly between 4 and 7 cm. It is at least rotatable around the swiveling axis 6 to an upright position in which it extends substantially vertical. In this position there is created in front of the first closing element 3 an opening in vertical direction, which is part of the roof opening 2. The first closing element 3 is a disturbing/turbulating element disturbing the boundary layer between the inside and outside of the vehicle, thereby reducing the booming effect by means of turbulated air passing above and below the first closing element 3. The first closing element 3 in this embodiment may also be provided with an air guide, for example in the form of specially shaped encapsulation material or baffles to influence and guide air flowing along the lower side of the first closing element 3. Other embodiments may also have such air guide.

Figure 27:
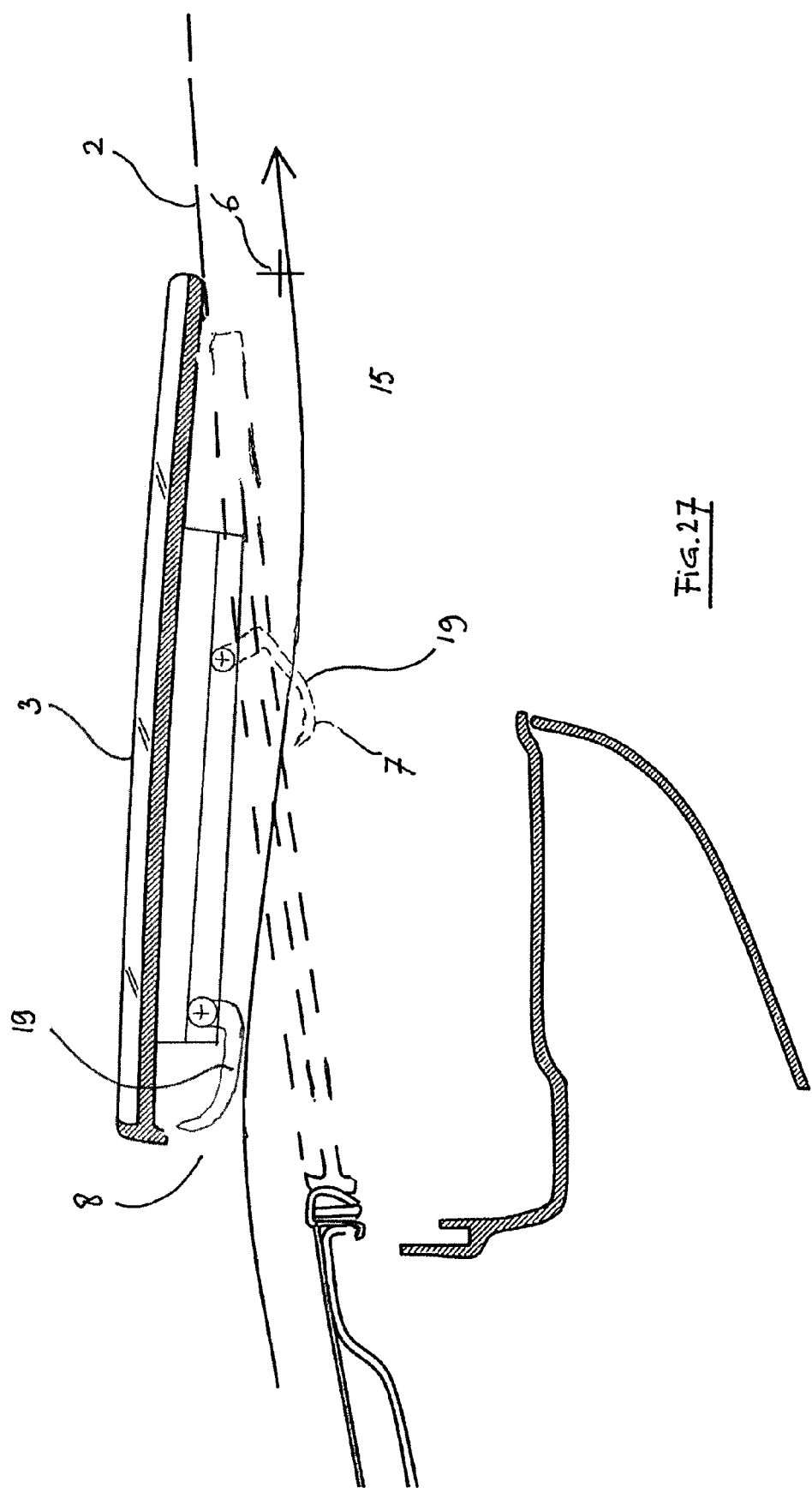
FIGS. 27 and 28 are views corresponding to those of FIG. 25, but showing an eleventh and twelfth embodiment of the open roof construction.

The embodiment of FIG. 27 comprises a first closing element 3 having on its lower side a movable baffle 19. In the embodiment shown, the baffle 19 is rotatable around a horizontal transverse axis and is slidable in longitudinal direction of the vehicle. The two extreme positions shown in the drawing are a front upwardly retracted position (shown in solid lines) and a rear downwardly rotated position (in dashed lines). Intermediate positions are possible, adjustment may be done by hand or automatically, as explained in relation to other embodiments. More than one baffle 19 is conceivable, in which the baffles may be positioned one behind the other and/or beside each other (if they only extend a part of the width of the first closing element 3). The baffle 19 may be closed to air flow, or permeable to a certain extent. It may act as air guide or just disturb air flow.

Figure 28:
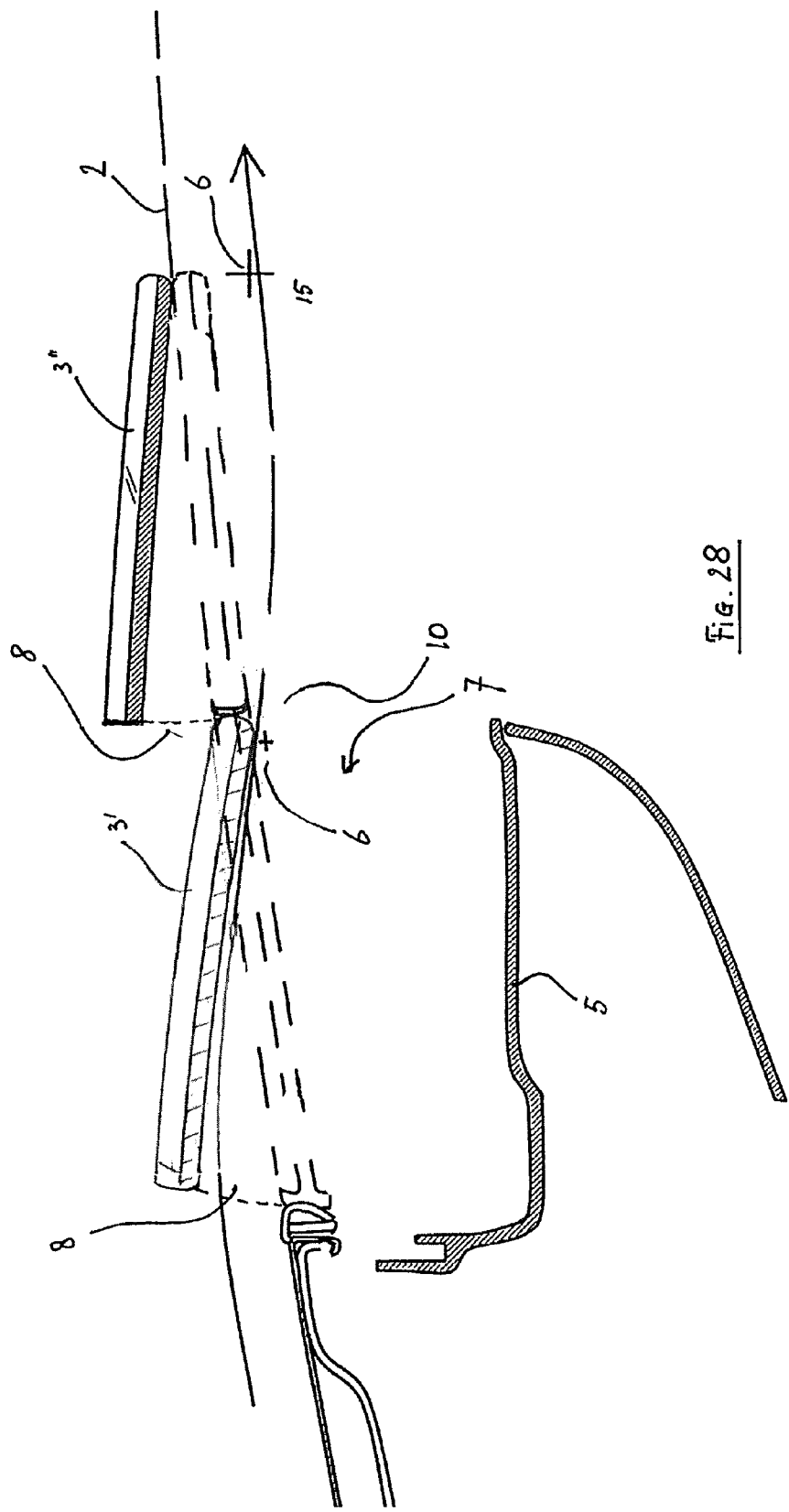

FIG. 28 shows another embodiment having two first closing elements 3' and 3", positioned one behind the other and each being swivable around a horizontal transverse axis 6 near the rear end of each first closing element 3', 3". The first closing elements 3' and 3" may be adjusted synchronously or independently of each other. The lower sides of the closing elements 3', 3" may act as an air guide or not. The upper sides of the closing elements 3', 3" may be finished so as to obtain a pleasant (non-disturbing) appearance in closed position. The lower sides of the closing elements 3', 3" may or not be configured as an air guide, just like in the other embodiments.

From the foregoing it will be apparent that the invention provides an open roof construction and a vehicle fitted therewith, by means of which undesirable flow effects over the roof opening are prevented in an effective manner.

The invention is not limited to the above-described embodiment as shown in the drawing, which can be varied in several ways within the scope of the invention. For example, the air guide may comprise at least one baffle for guiding and directing the air, the baffle projecting downwardly from the lower side of the first closing element and may act as a side guide for the air flow or as a guide influencing the air flow in vertical direction. The open roof construction may comprise one or more further closing elements, particularly behind the second closing element. The first closing element may also be divided into at least two parts in transversal direction and each part of the first closing element can be opened and closed individually and independent of each other.

The invention claimed is:

1. An open roof construction for a vehicle having a roof opening in a fixed roof portion, comprising:
   a stationary part configured to attach the open roof construction to the fixed roof portion,
   at least one first closing element movably supported by the stationary part and configured to move to an upward position with at least a front edge, and
   a second closing element, which is movably supported by the stationary part and being positioned rearward of said at least one first closing element, said second closing element configured to move between a closed position in which it closes said roof opening and an at least partly open position in which it is slid rearwardly, and wherein said at least one first closing element is provided with an air guide on a lower side of said at least one first closing element that is configured to guide and direct the air caught by said at least one first closing element, when in an upward position during forward driving of the vehicle, into a boundary layer of air which is situated between the outside and the inside of the vehicle at the position of the roof opening in front of the second closing element when said second closing element is in at least a partly open position in which it is slid rearwardly.

2. The open roof construction according to claim 1, wherein said at least one first closing element is configured to open and close part of the roof opening.

3. The open roof construction according to claim 1, wherein the air guide comprises at least one baffle configured to guide and direct the air, said baffle projecting downwardly from the lower side of said at least one first closing element.

4. The open roof construction according to claim 1, wherein the air guide comprises at least one solid body projecting downward from the lower side of said at least one first closing element, said solid body having a shape configured to guide an airflow in a desired direction when said at least one first closing element is in the upward position.

5. The open roof construction according to claim 1, wherein the air guide comprises at least one duct configured to guide and direct the air, said duct projecting downward from the lower side of said at least one first closing element.

6. The open roof construction according to claim 5, wherein a part of the duct is formed by the lower side of said at least one first closing element.

7. The open roof construction according to claim 1, wherein the air guide comprises a porous turbulation member configured to allow air to flow through and to turbulate the flow of air when said at least one first closing element is in the upward position, said turbulation member being attached on an upper end to the lower side of said at least one first closing element.

8. The open roof construction according to claim 7, wherein the turbulation member is at least one of an air permeable net and open cell foam, sealing on a lower end to the stationary part when said at least one first closing element is in the upward position.

9. The open roof construction according to claim 1, wherein the stationary part, in an area at the front of the open roof construction, is at least locally configured to guide the airflow in a desired direction when said at least one first closing element is in the upward position.

10. The open roof construction according to claim 3, wherein the air guide is adjustably attached to the lower side of said at least one first closing element to vary an angle thereof so as to direct the airflow into different directions.

11. The open roof construction according to claim 10, wherein said at least one first closing element comprises a drive to adjust the angular adjustment of the air guide.

12. The open roof construction according to claim 11, wherein the open roof construction further comprises a control device connected to the drive.

13. The open roof construction according to claim 1, wherein said at least one first closing element comprises at least two parts in a transversal direction.

14. The open roof construction according to claim 13, wherein each part of said at least one first closing element is configured to be opened and closed individually and independent of each other.

15. A vehicle having a roof opening in a fixed roof portion, comprising an open roof construction having a stationary part attaching the open roof construction to the fixed roof portion, said open roof construction comprising:
    a first closing element movably supported by the stationary part and configured to move a frontal edge thereof upwards to an upward position,
    a second closing element movably supported by the stationary part rearward of the first closing element, said second closing element configured to move between a closed position in which it closes said roof opening and an at least partly open position in which it is slid rearwardly, and
    wherein said first closing element is provided with an air guide on a lower side thereof that is configured to guide and direct the air caught by said first closing element, when in the upward position during forward driving of the vehicle, into a boundary layer of air which is situated between the outside and the inside of the vehicle at the position of the roof opening in front of the second closing element when said second closing element is in an at least partly open position in which it is slid rearwardly.

16. An open roof construction for a vehicle having a roof opening in a fixed roof portion, comprising:
    a stationary part configured to support the open roof construction in the fixed roof portion,
    at least one first closing element movably supported by the stationary part that is configured to move to an upward position with at least a front edge of the at least one first closing element, the upward position defining a gap below the front edge of said at least one first closing element, and with a rear edge at a level below the front edge during forward driving of the vehicle,
    a second closing element movably supported by the stationary part rearward of said at least one first closing element, said second closing element configured to move between a closed position that closes said roof opening and an at least partly open position in which it is slid rearwardly, and
    wherein said at least one first closing element is configured to close a first part of the roof opening in front of a second part of the roof opening that is closed by the second closing element in a closed position of the second closing element, the at least one first closing element configured to be raised when the second closing element is moved to a partly open position in which it is slid rearwardly.

17. The open roof construction according to claim 16, wherein the at least one first closing element is provided with an air guide on its lower side configured to guide and direct the air caught by said at least one first closing element when in the upward position during driving of the vehicle into a boundary layer of air which is situated between the outside and the inside of the vehicle at a position of the roof opening in front of the second closing element when said second closing element is in an at least partly open position.

18. The open roof construction according to claim 16, wherein the at least first closing element comprises a closable opening providing a passage between the upper and lower side of the at least one first closing element.

19. The open roof construction according to claim 18, wherein the opening is closable by a closing member which is adjustable.

20. The open roof construction according to claim 16, wherein the at least one first closing element has a length in a longitudinal direction of the vehicle when in closed position of maximally 10 cm.

21. The open roof construction according to claim 20, wherein the at least one first closing element is movable to an open position in which the at least one first closing element is positioned substantially vertically.

22. The open roof construction according to claim 16, wherein the at least one first closing element comprises at least one baffle projecting downwardly from the lower side of said at least one first closing element in the open position.

23. The open roof construction according to claim 22, wherein the baffle is at least rotatable with respect to said at least one first closing element.

24. The open roof construction according to claim 22, wherein the baffle is slidable with respect to said at least one first closing element in a longitudinal direction of the vehicle.

25. An open roof construction for a vehicle having a roof opening in a fixed roof portion, comprising:
- a stationary part configured to attach the open roof construction to the fixed roof portion,
- two first closing elements movably supported by the stationary part and configured to move to an upward position with at least a front edge, the two first closing elements being positioned one behind the other, and
- a second closing element, which is movably supported by the stationary part and being positioned rearward of the two first closing elements, said second closing element configured to move between a closed position in which it closes said roof opening and an at least partly open position, and
- wherein at least one of said two first closing elements is provided with an air guide on a lower side that is configured to guide and direct the air caught by said at least one of said two first closing elements, when in an upward position during forward driving of the vehicle, into a boundary layer of air which is situated between the outside and the inside of the vehicle at the position of the roof opening when said second closing element is in at least a partly open position.

* * * * *